United States Patent
Kihara et al.

(10) Patent No.: US 7,266,564 B2
(45) Date of Patent: Sep. 4, 2007

(54) CONTROL SYSTEM AND METHOD FOR MANAGEMENT ITEMS

(75) Inventors: Kenichi Kihara, Tokyo (JP); Yusuke Izumida, Chigasaki (JP); Toshiaki Hirata, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 567 days.

(21) Appl. No.: 10/826,476

(22) Filed: Apr. 16, 2004

(65) Prior Publication Data

US 2005/0004931 A1 Jan. 6, 2005

(30) Foreign Application Priority Data

May 20, 2003 (JP) .............................. 2003-141840
Mar. 4, 2004 (JP) .............................. 2004-059980

(51) Int. Cl.
*G06F 7/00* (2006.01)
*G06F 17/00* (2006.01)
*G06F 15/173* (2006.01)

(52) U.S. Cl. ........................................ 707/102; 709/223
(58) Field of Classification Search .................... 707/3, 707/10, 101, 102
See application file for complete search history.

(56) References Cited

U.S. PATENT DOCUMENTS

| | | | |
|---|---|---|---|
| 6,112,237 A * | 8/2000 | Donaldson et al. | 709/224 |
| 6,182,134 B1 * | 1/2001 | Collins et al. | 709/224 |
| 6,272,537 B1 * | 8/2001 | Kekic et al. | 709/223 |
| 6,314,446 B1 | 11/2001 | Stiles | |
| 6,425,006 B1 | 7/2002 | Chari et al. | |
| 6,480,901 B1 * | 11/2002 | Weber et al. | 709/246 |
| 6,505,245 B1 | 1/2003 | North et al. | |
| 6,532,491 B1 | 3/2003 | Lakis et al. | |
| 6,769,022 B1 | 7/2004 | DeKoning et al. | |
| 2003/0191836 A1 | 10/2003 | Murtha et al. | |
| 2003/0204583 A1 | 10/2003 | Kaneda et al. | |

(Continued)

FOREIGN PATENT DOCUMENTS

EP 0697655 A 3/2002

(Continued)

OTHER PUBLICATIONS

"Sun™ Control Station 2.2 Health Monitoring Module", Sun Microsystems Santa Clara, CA (Dec. 2004).

*Primary Examiner*—Sam Rimell
*Assistant Examiner*—Jared M Bibbee
(74) *Attorney, Agent, or Firm*—Townsend and Townsend and Crew LLP

(57) ABSTRACT

To reduce the burden of labor relating to setting and changing management items in an environment where a plurality of management tools are used. In one specific embodiment, management tools 1332 control management targets 1331 on the basis of retained management definition information (management items) 1333. A user I/F unit 1131 displays operations management information 36 and selects an editing class and management items of the management tools 1332 by an instruction of a user, and an editing instruction unit 1134 sends the editing class and the management items to an editing execution unit 1334 and conducts editing of the management items. A status monitoring unit 1335 monitors status, a change detection unit 1135 detects a status change and notifies the editing instruction unit 1134, and the editing instruction unit 1134 receives this notification and instructs editing processing with respect to management items relating to the management targets 1331.

25 Claims, 16 Drawing Sheets

U.S. PATENT DOCUMENTS

| | | |
|---|---|---|
| 2004/0128443 A1 | 7/2004 | Kaneda et al. |
| 2004/0148385 A1 | 7/2004 | Srinivasan et al. |
| 2004/0158656 A1 | 8/2004 | Fujibayashi et al. |
| 2004/0210791 A1 | 10/2004 | Akagawa et al. |
| 2004/0225689 A1 | 11/2004 | Dettinger et al. |

FOREIGN PATENT DOCUMENTS

| | | |
|---|---|---|
| JP | 06-301436 A | 10/1994 |
| JP | 2000-222316 | 8/2000 |
| JP | 2000-250833 | 9/2000 |
| JP | 11119662 | 11/2000 |

* cited by examiner

EXAMPLE OF SYSTEM CONFIGURATION

FIG.3

MANAGEMENT DEFINITION INFORMATION 1: FOR BACKUP SCHEDULER

| TASK ID | HOST NAME | BACKUP TARGET | EXECUTION CONDITION | VALIDITY |
|---|---|---|---|---|
| 1 | host | C : | EVERY DAY 03:00 | VALID |
| 2 | hostT | D : | EVERY DAY 03:00 | VALID |

FIG.4

MANAGEMENT DEFINITION INFORMATION 2 :
FOR HOST OPERATION MONITOR

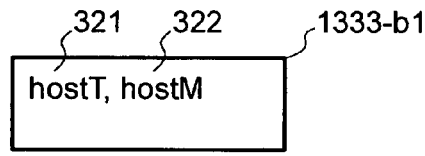

hostT, hostM

FIG.5

MANAGEMENT DEFINITION INFORMATION 3 : FOR DISK REPORTER

| HOST | MEASUREMENT ITEMS | MEASUREMENT TARGET |
|---|---|---|
| hostT | FREE CAPACITY OF DISK | C : |
| hostT | FREE CAPACITY OF DISK | D : |

FIG.6

MANAGEMENT DEFINITION INFORMATION 4 : FOR DISK MONITOR

| MEASUREMENT ITEMS | MEASUREMENT TARGET | WARNING CONDITION |
|---|---|---|
| FREE CAPACITY OF DISK | C : | <10% |
| FREE CAPACITY OF DISK | D : | <15% |

FORMAT OF EDITING INSTRUCTION

| LOCATION OF MANAGEMENT TOOL | TYPE OF MANAGEMENT TOOL | TYPE OF EDITING FUNCTION |
|---|---|---|
| LOCATION OF MANAGEMENT TARGET | TYPE OF MANAGEMENT TARGET | MANAGEMENT TARGET IDENTIFIER |
| OPTIONS | | |

211, 212, 213, 21, 214, 215, 216, 217

EXAMPLE OF MAIN SCREEN

EXAMPLE OF MANAGEMENT INFORMATION SCREEN OF MANAGEMENT TARGET

FIG.13

MANAGEMENT TARGET CONFIGURATION INFORMATION 35

| MANAGEMENT TARGET CORRESPONDING TO CHILD | | | MANAGEMENT TARGET CORRESPONDING TO PARENT | | |
|---|---|---|---|---|---|
| IDENTIFIER | TYPE | LOCATION | IDENTIFIER | TYPE | LOCATION |
| hostT | HOST | — | — | — | — |
| C: | DRIVE | hostT | hostT | HOST | — |
| D: | DRIVE | hostT | hostT | HOST | — |

FIG.14

OPERATIONS MANAGEMENT INFORMATION 36

| MANAGEMENT TARGET | | | MANAGEMENT TOOL | | |
|---|---|---|---|---|---|
| IDENTIFIER | TYPE | LOCATION | TYPE | LOCATION | STATUS |
| hostT | HOST | — | HOST OPERATION MONITOR | hostMb | VALID |
| C: | DRIVE | hostT | DISK MONITOR | hostT | VALID |
| C: | DRIVE | hostT | DISK REPORTER | hostMb | VALID |
| C: | DRIVE | hostT | BACKUP SCHEDULER | hostMa | VALID |
| D: | DRIVE | hostT | DISK MONITOR | hostT | VALID |
| D: | DRIVE | hostT | DISK REPORTER | hostMb | VALID |
| D: | DRIVE | hostT | BACKUP SCHEDULER | hostMa | VALID |

FIG.15

BACKUP DATA MANAGEMENT TABLE

| BACKUP ID | MANAGEMENT TARGET | | | MANAGEMENT TOOL | | DATA STORAGE DESTINATION FILE NAME | DATE AND TIME OF CREATION |
|---|---|---|---|---|---|---|---|
| | IDENTIFIER | TYPE | LOCATION | TYPE | LOCATION | | |
| BACKUP1 | hostT | HOST | root | HOST OPERATION MONITOR | — | d:¥BACKUP1¥01a.dat<br>d:¥BACKUP1¥01b.dat | 2003/01/15 12:00 |
| BACKUP1 | D: | HOST | root | DISK MONITOR | hostT | d:¥BACKUP1¥02a.dat<br>d:¥BACKUP1¥02b.dat | 2003/01/15 12:00 |

FIG.18

MANAGEMENT TOOL DISPOSITION INFORMATION  ⟋38

| LOCATION OF MANAGEMENT TOOL | TYPE OF MANAGEMENT TOOL |
|---|---|
| hostMa | BACKUP SCHEDULER |
| hostMb | DISK REPORTER |
| hostMb | HOST OPERATION MONITOR |
| hostT | DISK MONITOR |

FIG.19

MANAGEMENT TOOL CHARACTERISTIC INFORMATION  ⟋39

| TYPE OF MANAGEMENT TOOL | LIMITED TO SAME HOST |
|---|---|
| BACKUP SCHEDULER | NO |
| DISK REPORTER | NO |
| HOST OPERATION MONITOR | NO |
| DISK MONITOR | YES |

EXAMPLE OF SYSTEM CONFIGURATION (2)

SETTING SCREEN FOR DRIVE ADDITION

CONTROL SYSTEM AND METHOD FOR MANAGEMENT ITEMS

CROSS-REFERENCES TO RELATED APPLICATIONS

This application relates to and claims priority from Japanese Patent Application Nos. 2003-141840, filed on May 20, 2003, and 2004-059980, filed on Mar. 4, 2004, the entire disclosures of which are incorporated herein by reference.

BACKGROUND OF THE INVENTION

1. Field of the Invention

The present invention relates mainly to the field of network/system management. In particular, the invention relates to technology for managing management items of tools that conduct automatic execution of data backup and monitoring of the operating status of computers in order to support the normal operation of computer systems.

2. Description of the Related Art

Operations management tools (referred to below as management tools) are used with the purpose of normally operating computer systems and, in the event that there is a problem, investigating the nature of the problem and implementing a countermeasure. In JP-A-2000-250833, management tools are described that monitor whether or not a computer system is in an operating status, check whether or not the CPU load of the computer system is excessive and check whether or not disk capacity has become insufficient.

The types of management tools are various, and the ranges thereof (range of functions offered) also differ for each management tool. For this reason, plural management tools are often jointly used to a certain extent in large computer systems. However, what becomes a problem in this case is the disunity of operability among the management tools. Although management tools are made by various manufacturers, the operability of the management tools differs depending on the type of management tools because there are no design standards common to the industry. As a result, in environments where plural management tools are used, it is necessary to learn how to operate and appropriately use each management tool, whereby the burden on the user of the management tools increases.

To solve this problem, JP-A-2000-222316 discloses a method that enables different management tools to be handled with a unified operation method by internally disposing a function for absorbing differences in operability between the tools. As the management tools are used, labor for determining the content (referred to below as management items) managed by each management tool and setting that content with respect to each management tool becomes necessary. Additionally, in a case where the determined content of the management items has changed after temporary setting has been conducted, the set content of the management tools must be updated (reset). Such labor for setting and changing the management items has conventionally been conducted per management tool. However, in an environment where the number of management tools being used is large, labor for setting and changing the management items also increases, whereby the same labor becomes cumbersome, labor time becomes long and it also becomes easy for errors in setting changes to arise.

BRIEF SUMMARY OF THE INVENTION

Embodiments of the present invention provide ways to reduce the burden of labor relating to setting and changing management items in an environment where plural (or numerous) management tools are used.

In one embodiment, a management item management system manages management items with respect to management targets retained by an operations management module that operates and manages management target elements serving as management targets in a computer system, the management item management system including: a module configured to accumulate operations management information that identifies management target elements and operations management module managing the management target elements; a display module configured to display the operations management information; a selection module configured to select operations management information from display content in response to an instruction of a user; and a module configured to determine management items that the operations management module retains and which serve as editing processing items on the basis of the selected operations management information.

Also, the display module displays plural editing processing classes with respect to the operations management information and the management items, the selection module selects the operations management information and the plural editing processing classes with respect to the management items in response to the instruction of the user, and includes an editing instruction unit configured to issue an editing instruction for editing processing of the selected editing processing classes with respect to the determined management items.

Also, the operations management tool includes editing means for editing the retained management items, with the editing module executing editing of the management items on the basis of an editing instruction from the editing instruction unit.

The embodiment also includes a module configured to detect a change in the status of the management target elements and, on the basis of the detection result, notifies the editing instruction unit of management items retained by the operations management module that manages the management target elements in which the status change has occurred, wherein the editing instruction unit receives the notification and instructs editing with respect to the management items.

Another aspect of the invention is directed to a management item management system for managing management items with respect to management targets retained by an operations management module that operates and manages the management targets in a computer system. The management item management system comprises an operations management information module configured to accumulate operations management information that identifies management targets and operations management modules managing the management targets in the computer system; a display module configured to display the management targets; and a selection module configured to select an operations management module which retains the management target displayed by the display module in response to an instruction of a user, wherein the operations management information identifies management items.

BRIEF DESCRIPTION OF THE DRAWINGS

FIG. 3 is a diagram showing management definition information 1 for a backup scheduler;

FIG. 4 is a diagram showing management definition information 2 for a host operation monitor;

FIG. 5 is a diagram showing management definition information 3 for a disk monitor;

FIG. 6 is a diagram showing management definition information 4 for a disk reporter;

FIG. 7 is a diagram showing the format of an editing instruction;

FIG. 13 is a diagram showing an example of management target configuration information;

FIG. 14 is a diagram showing an example of operations management information;

FIG. 15 is a diagram showing an example of a backup data management table;

FIG. 18 is a diagram showing management tool disposition information;

FIG. 19 is a diagram showing management tool characteristic information;

DETAILED DESCRIPTION OF THE INVENTION

Embodiments of the present invention are directed to conducting maintenance of management items of an operations management module (referred to below as management tools) per management target. In the following description, definition information or management definition information is definition content of management items; and management items, definition information and management definition information will be used interchangeably to refer to the same thing. Thus, a system for grasping how management targets are managed by which management tools and updating definition information of management tools per management target will be prepared.

Figure 1:
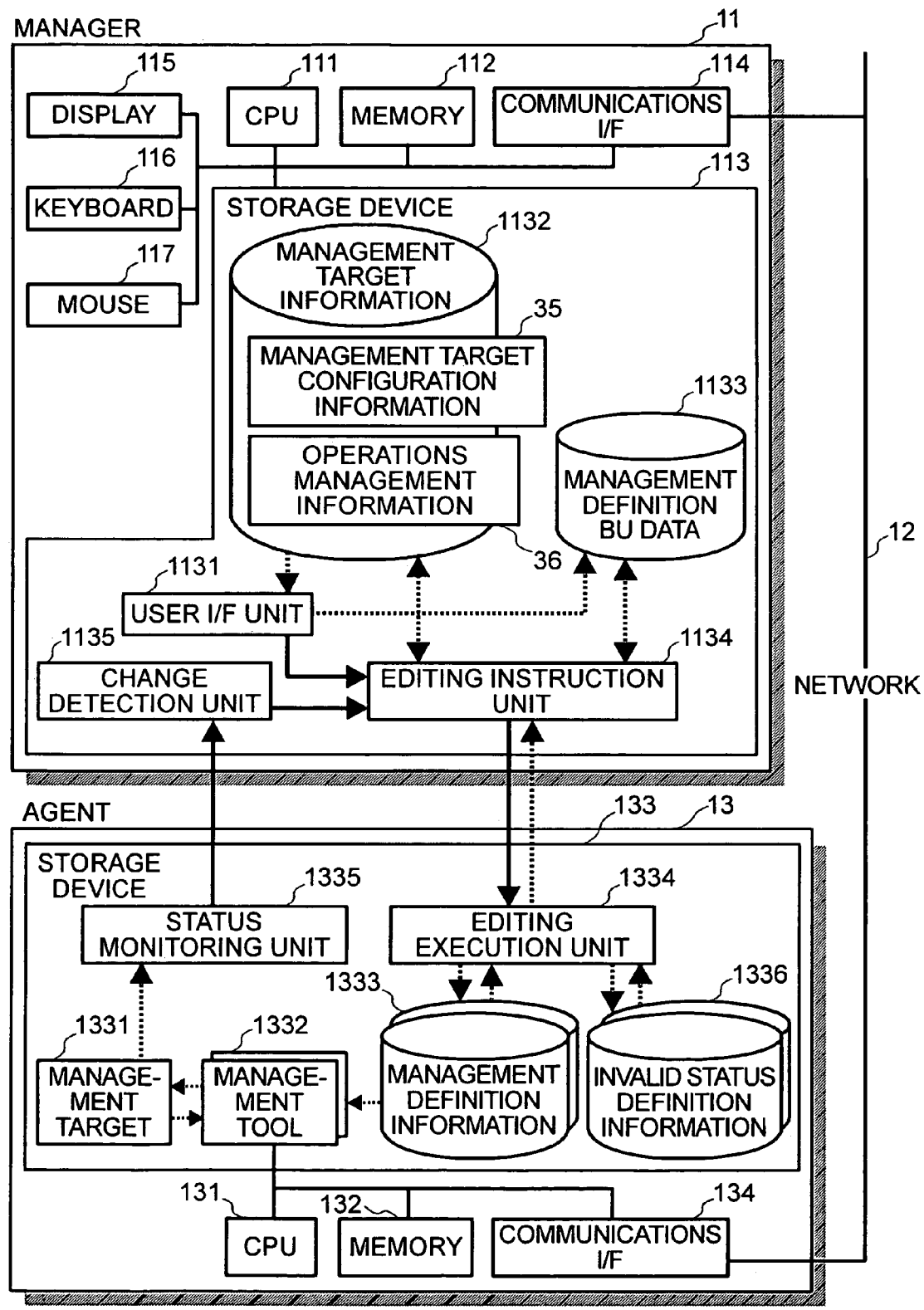
FIG. 1 is a diagram showing the configuration of an embodiment of the invention.

FIG. 1 shows the basic form of an exemplary embodiment of the invention. A manager 11 has functions for grasping the management status of each management target and instructing an agent 13 to edit the definition information of the management tools. The agent 13 has the function of executing editing of the definition information of the management tools on the basis of the instruction from the manager 11.

The manager 11 and the agent 13 are connected through a network 12 so that mutual exchange of information can be conducted. It should be noted that, although the manager 11 and the agent 13 are depicted as separate devices in FIG. 1, both may be embodied in the same device. Also, there may be more than one manager 11 and more than one agent 13.

Examples of the editing content of the definition information include deletion, temporary stopping, cancellation of temporary stopping, changing a management target name, backing up, and restoration. In the present example, description will be given where these six editing functions are realized. It is not the case that all of these editing functions are necessary during implementation of embodiments of the invention. However, with respect to the functions of temporary stopping, cancellation of temporary stopping, backing up and restoration, it is preferable to determine whether or not they are to be implemented with a set form because of their respective close relationships.

An embodiment of the invention will be described below in the order of the agent 13 and the manager 11. The agent 13 is a portion corresponding to the limbs in the system of the embodiment, and in the description thereof, an outline of the management tools that are the management targets of the embodiment and a method of updating management items will be described. The manager 11 is a portion corresponding to the brains in the system of the embodiment, and in the description thereof, the portion serving as the core of the embodiment, i.e., a method of managing the relations between the management targets and the management tools and a way of giving processing instructions with respect to the agent 13 will be described.

1. Agent

The agent 13 is an information processing device. The agent 13 can activate programs stored in a storage device 133 using a CPU 131 and a memory 132 and exchange information with the manager 11 using a communications I/F 134. The constituent elements inside the agent 13 pertaining to the essence of the embodiment are a processing or management target 1331, a management tool 1332, management definition information 1333, an editing execution unit 1334 and a status monitoring unit 1335. Although these constituent elements are all listed in the same agent 13 in FIG. 1, they may be separately disposed in plural agents 13. Also, the number of each constituent element is not particularly limited and may be plural. The relationships between the constituent elements are as follows.

The management target 1331 is managed by the management tool 1332. The content of the management labor that the management tool 1332 conducts is defined in the management definition information 1333. The editing execution unit 1334 updates the content of the management definition information 1333 and sends the content of management definition information 1333 and invalid status definition information 1336 to the manager 11 on the basis of an instruction from an editing instruction unit 1134 inside the manager 11.

Also, the status monitoring unit 1335 monitors the status of the management target 1331 and notifies a change detection unit 1135 in the manager 11 of information relating to the status or a change in the status.

It should be noted that, although the connection between the editing instruction unit 1134 inside the manager 11 and the editing execution unit 1334 inside the agent 13 and the connection between the status monitoring unit 1335 inside the agent 13 and the change detection unit 1135 inside the manager 11 are represented by arrow lines so that they appear to be directly connected, the connections in both cases are connections via the network.

Details of the constituent elements inside the agent 13 pertaining to the essence of the invention will be described below. In the description thereof, a management system shown in FIG. 2 will be used as a model case for description (in FIG. 2, description of information (management target information 1132) is omitted).

1.1 Management Target

The management target 1331 is realized by software (a program) stored in the storage device 113 being read in a memory 112 and executed by the CPU 111. If the software of the management target 1331 is executable inside the agent 13, it may be stored in a location other than the storage device 133. Alternatively, in contrast to the above, the management target 1331 may also be a device (hardware) itself, such as a hard disk drive.

Figure 2:
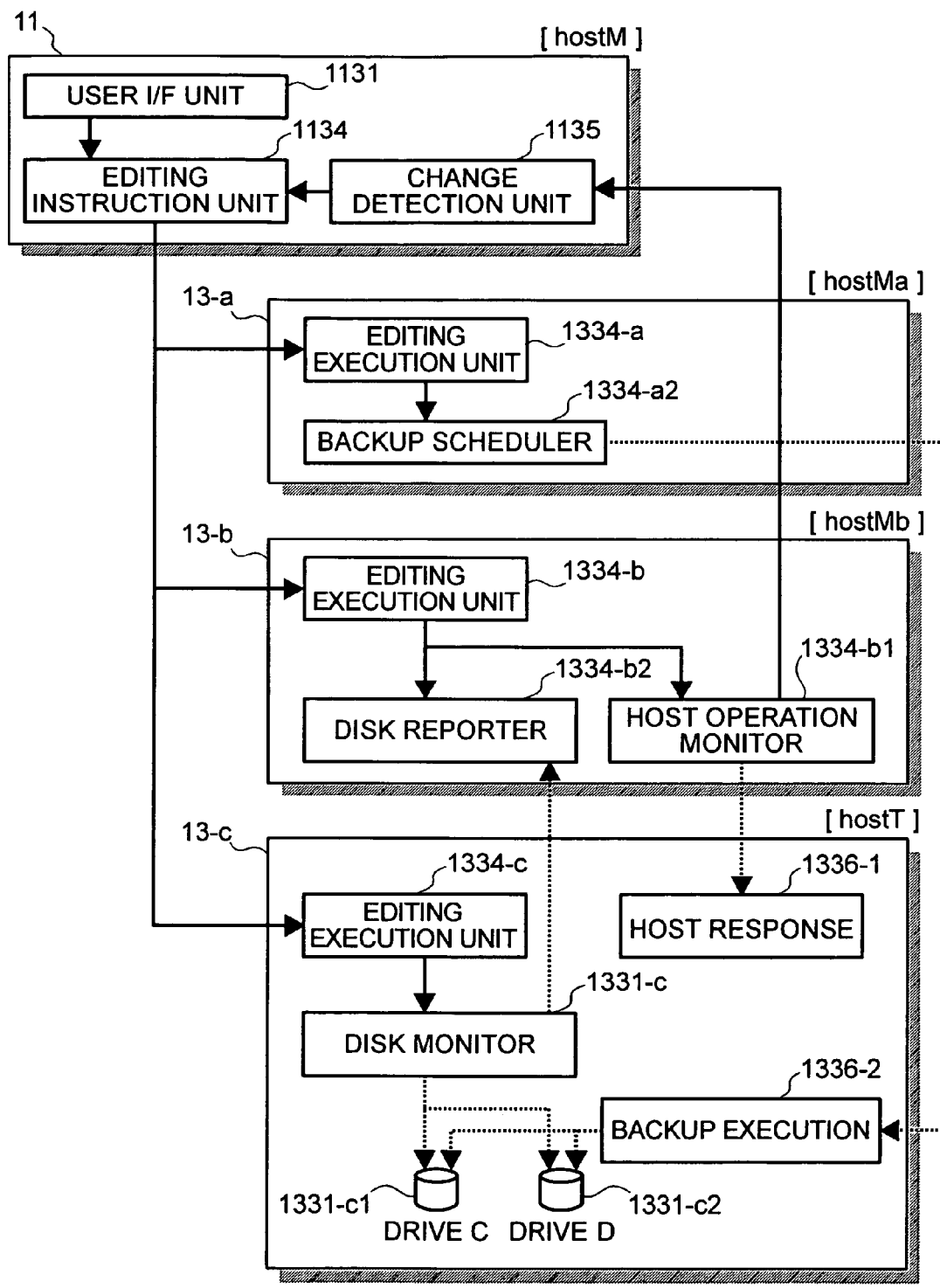
FIG. 2 is a diagram showing an example of a system configuration of an embodiment of the invention.
Figure 20:
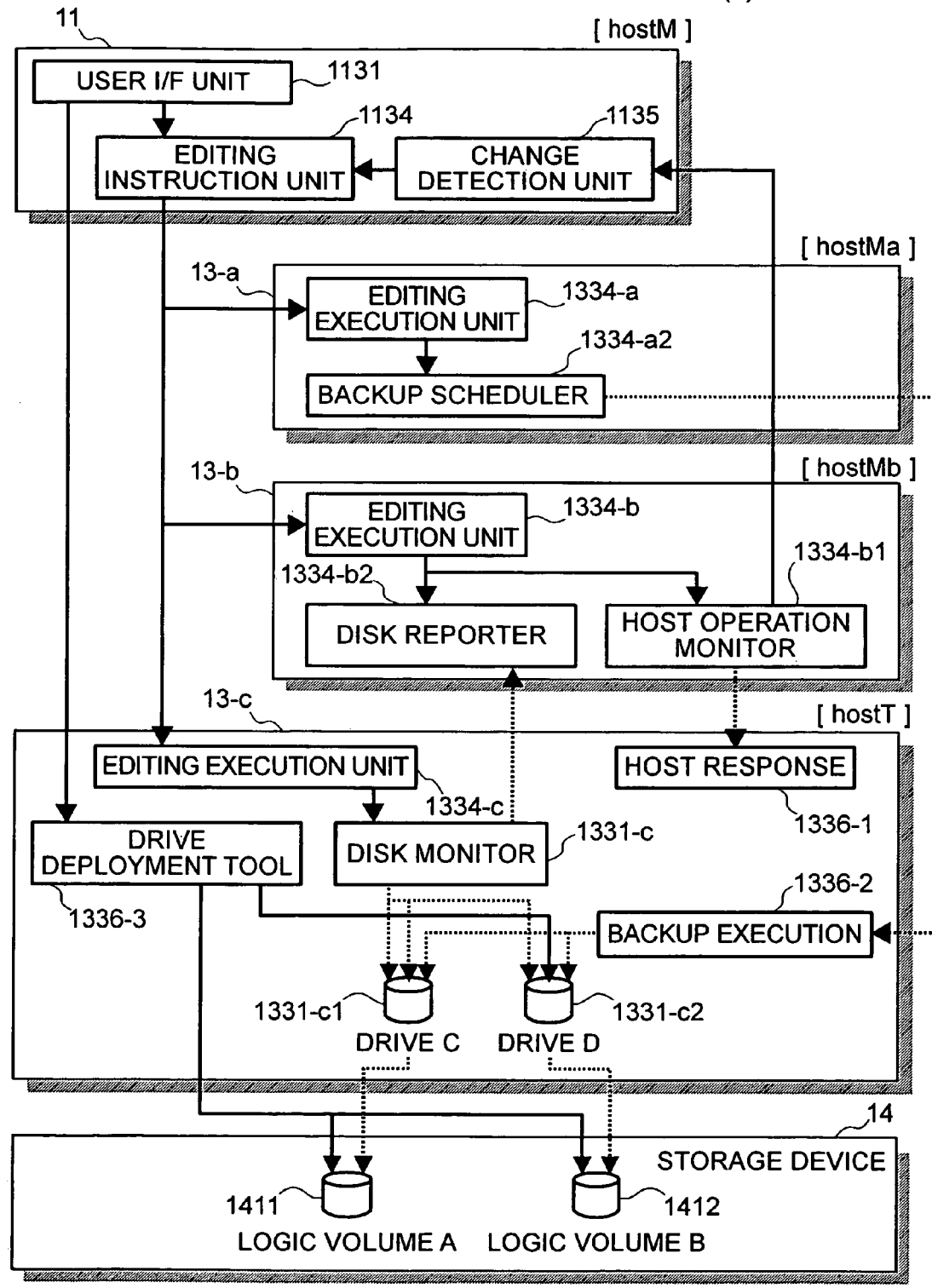
FIG. 20 is a diagram showing the configuration of an embodiment of the invention including a storage device.

In the model case of FIG. 2, an agent (hostT) 13-*c* and a drive C 1331-*c*1 and a drive D 1331-*c*2 in the agent (hostT) 13-*c* correspond to the management target 1331. The agent (hostT) 13-*c* is a single information processing device having a network connecting function, and is monitored (managed) from a host operation monitor 1334-*b*1 inside an agent (hostMb) 13-*b* via a host response 1336-1 inside the agent (hostT) 13-*c*. The drive C 1331-*c*1 and the drive D 1331-*c*2 are (respectively separate) disk drive devices, are managed (monitored) by a disk performance monitor 1331-*c* inside the agent (hostT) and, at the same time, are also targets of data backup via a backup execution 1336-2 inside the agent (hostT) from a backup scheduler 1334-*a*2 inside an agent (hostMa). Also, the bodies (final information storage locations) of the drive C 1331-*c*1 and the drive D 1331-*c*2 can be placed in a storage device separate from the agent (hostT). FIG. 20 shows an example thereof.

In the configuration of FIG. 20, a storage device 14 is a data storage device and is used by being connected to the agent (hostT). Logic volumes (data storage regions) inside the storage device 14 are optionally addable/deletable using a drive deployment tool 1336-3 and are used by being allocated to the drives inside the agent (hostT). In FIG. 20, the drive C 1331-*c*1 is allocated to a logic volume A 1411 and the drive D 1331-*c*2 is allocated to a logic volume B 1412. When reading/writing corresponding to the drives is conducted, reading/writing to the corresponding logic volumes is conducted. Although description will be given in the present example using mainly the system configuration of FIG. 2, part of applicable functions will be described with appropriate reference to the system configuration of FIG. 20.

1.2 Management Tool

The management tool 1332 is realized by software (a program) stored in the storage device 113 being read in the memory 112 and executed by the CPU 111. If the software of the management tool 1332 is executable inside the agent 13, it may be stored in a location other than the storage device 133. The main role of the management tool 1332 is conducting various maintenance processing necessary for the creation, maintenance and deletion of the management target 1331. The function of the management tool 1332 described in Section 1.2 is a common function, and description relating to the method of realizing various functions will be omitted because the essence of the embodiment is not in the realization of the management tool 1332 itself.

That which corresponds to the management tool 1332 in the model case of FIG. 2 are the backup scheduler 1334-*a*2 inside the agent (hostMa) 13-*a*, the host operation monitor 1334-*b*1 and the disk reporter 1334-*b*2 inside the agent (hostMb) 13-*b*, and the disk performance monitor 1331-*c* inside the agent (hostT) 13-*d*. Moreover, as the management tool 1332 of supplemental positioning, there are the backup execution 1336-2 and the host response 1336-1 inside the agent (hostT) 13-*c*.

(1) Function of Backup Scheduler

The backup scheduler 1334-*a*2 is a management tool 1322 for controlling the execution of data backup of the disk drives. By designating the executed content of data backup with respect to the backup scheduler 1334-*a*2, an execution function (data backup execution 1336-2) of data backup is called when it has become the time of designated conditions. For example, when designated as "back up the content of the drive C 1331-*c*1 on the agent (hostT) 13-*c* everyday at 3:00" with respect to the backup scheduler 1334-*a*2, the backup scheduler 1334-*a*2 continually checks the current time, and data backup of the content of the drive C 1331-*c*1 is executed at the point in time when it has become 3:00 a.m., which is the designated time.

(2) Function of Host Operation Monitor

The host operation monitor 1334-*b*1 checks whether or not the host (information processing device) is operating normally. As for the method of checking, the host operation monitor 1334-*b*1 periodically issues an inquiry to the monitored target host as to whether or not the host is operating. When a response is received from the monitored target, the host operation monitor 1334-*b*1 determines that the host is "operating", and when no response is received from the monitored target, the host operation monitor 1334-*b*1 determines that the host is "not operating".

In FIG. 2, a "host response 1336-1" having the function of responding to the inquiry from the host operation monitor 1334-*b*1 is disposed in the agent (hostT) 13-*c* that is the monitored target. When it is determined as a result of this check that the monitored target host is not operating, notification is given by notifying another host (agent (hostM) 11, etc.) of this.

(3) Functions of Disk Monitor

The disk monitor 1331-*c* measures the free capacity and access amount of the disk drive. Moreover, as supplementary functions, the disk monitor 1331-*c* has the function of giving a warning when the value of the measurement result fits the designated condition and the function of delivering the measured result to the disk reporter 1334-*b*2.

(4) Function of Disk Reporter

The disk reporter 1334-*b*2 has the function of periodically collecting and tallying the result measured by the disk monitor 1331-*c*.

1.3 Management Definition Information

The management definition information 1333 defines the processing content of the management tool 1332, and is present in the form of a file or database.

In the configuration of FIG. 1, the saved location of the management definition information 1333 is inside the storage device 133 in the agent 13, but it may also be another location as long as it is a location that can be referenced from the editing execution unit 1334 or the management tool 1332.

(1) Management Definition Information of Backup Scheduler

The function of the backup scheduler 1334-*a*2 is, as described in Section 1.2(1), to conduct back up with respect to the drive (backup target) of the host designated by the designated conditions. There are three pieces of basic information necessary for this function: execution conditions, host name and drive name. These three items form one set so that backup tasks of plural sets can be processed.

FIG. 3 is an example of management definition information 1333-*a* for the backup scheduler 1334-*a*2, and assumes information stored in a record of a database. The information stored therein includes, in addition to the aforementioned three items, a task ID 311 for clearly discriminating plural backup tasks and an item 315 that can designate the validity/invalidity of the backup tasks. Information is retained using this total of five items as one record (one line in FIG. 3).

(2) Management Definition Information of Host Operation Monitor

The function of the host operation monitor 1334-*b*1 is, as described in Section 1.2(2), to monitor the status of the designated host and notify the designated host if there is a change in the status. There are two items necessary for designating the content thereof: the name of the monitored target host and the status notification destination host.

FIG. 4 is an example of management definition information 1333-*b*1 for the host operation monitor 1334-*b*1, and assumes information stored in a text file. The two aforementioned items are described in the text file in one line in the order of a monitoring target host 321 and a status notification destination host 322 by comma partitioning, and plural monitoring targets are defined by the descriptions of plural lines.

(3) Management Definition of Disk Reporter

The function of the disk reporter 1334-*b*2 is, as described in Section 1.2(3), to collect and tally the information of the measurement items and measurement targets designated from the designated disk monitor 1331-*c*. There are a total of three items necessary therefor: a host name 331 in which the disk monitor 1331-*c* of the collection source is included, a measurement item 332 and a measurement target 333 that the same disk monitor 1331-*c* has collected (in the present example, the definition relating to the sum of the collected information is omitted).

FIG. 5 is an example of management definition information 1333-*b*2 for the disk reporter 1334-*b*2. A record stored in the database is assumed, and information is retained using the aforementioned three items as one record (one line in FIG. 5).

(4) Management Definition of Disk Monitor

The function of the disk monitor 1331-*c* is, as described in Section 1.2(4), to measure items relating to the designated disk drive and provide a warning if they are conditions where the measurement result is designated. There are three pieces of information necessary therefor: a measurement item 341, a measurement target 342 and a condition 333 providing warning.

FIG. 6 is an example of management definition information 1333-*c* for the disk monitor 1331-*c*. A record stored in the database is assumed, and information is retained using the aforementioned three items as one record (one line in FIG. 6).

1.4 Editing Execution Unit

The editing execution unit 1334 is realized by software (a program) stored in the storage device 133 being read into the memory 132 and executed by the CPU 131. It should be noted that the software of the editing execution unit 1334 may also be stored in a location other than the storage device 133 as long as it can be executed in the agent 13. The software may also be stored in a storage medium such as a flexible disk, read from the storage medium, stored in a storage device in the system such as the storage device 133, and executed. The main role of the editing execution unit 1334 is to execute editing processing of the management definition information 1333 on the basis of an instruction sent from the editing instruction unit 1134 in the manager 11.

As described in the opening of the "Detailed Description of the Invention" Section, there are six forms of editing processing content: deletion, temporary stopping, cancellation of temporary stopping, changing the management target name, backup and restoration. The content of the instruction from the editing instruction unit 1134 includes how editing operations are to be conducted with respect to which management target 1331 of which management tool 1332.

FIG. 7 is an example of the format of the editing instruction 21 sent to the editing execution unit 1334 from the editing instruction unit 1134. The location 211 of the management tool and the type 212 of the management tool are information used to identify the management tool. Included in the former is the host name in which the management tool 1332 is located, and included in the latter is a name ("host operation monitoring", etc.) for discriminating the type of management tool. The location 214 of the management target is information representing the location in which the management target 1331 is placed. For example, in the case of the management target 1331 directly under a host such as the disk drive, the host name is included. The type 215 of the management target is information representing the type of management target 1331, and includes "host" and "disk drive".

A management target identifier 216 is, as indicated by its name, an identifier given to the management target. In a case where the management target 1331 is a host, the drive name ("C:", etc.) is included if the host name is similarly the disk drive. Information representing the type of editing function (e.g., "delete" or "temporarily stop") is included in the type 213 of editing function. Options 217 are additional information, and the content of encompassed information differs according to the type 213 of editing function.

Figure 8:
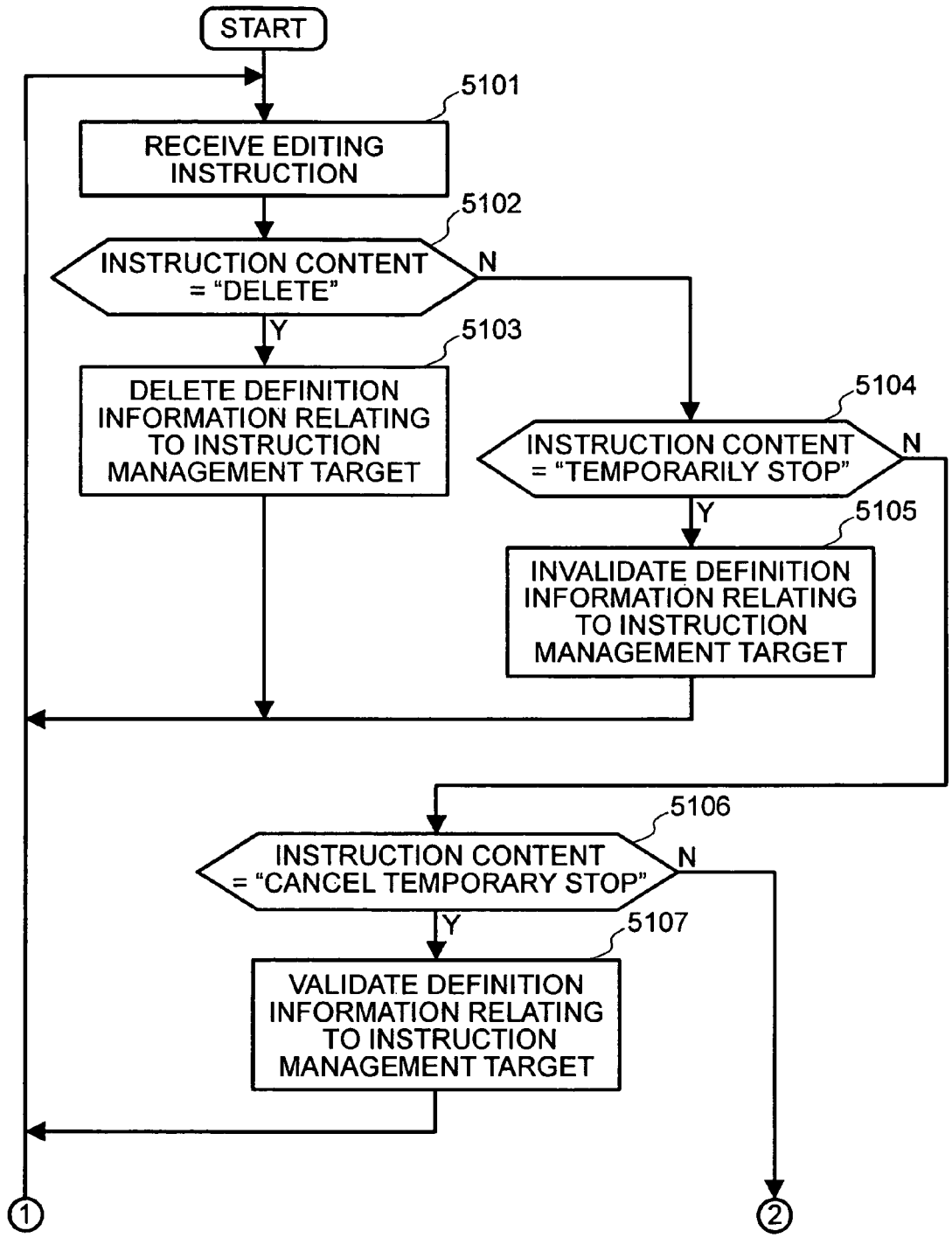
FIG. 8 is a diagram showing a flow chart (part 1) of processing of an editing execution unit.
Figure 9:
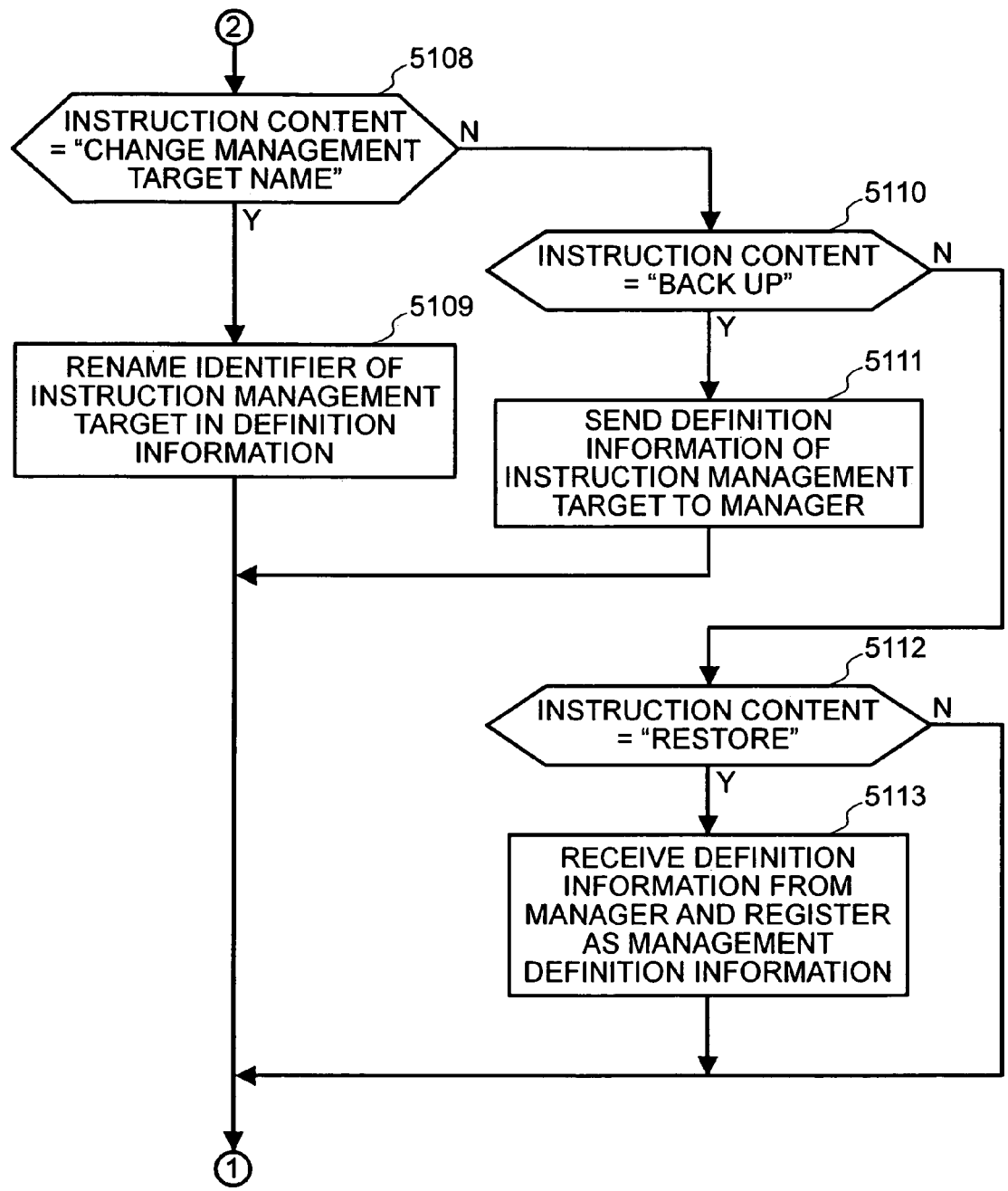
FIG. 9 is a diagram showing a flow chart (part 2) of processing of the editing execution unit.

The processing of the editing execution unit 1334 differs according to the designated content of the type 213 of editing functions included in the editing instruction 21, and is overall as shown in FIGS. 8 and 9. The outline of processing is described below.

First, the editing instruction 21 is received from the manager 11 (5101). Then, it is checked whether or not the content of the type 213 of the editing function in the received editing instruction 21 is "delete" (5102). If it is "delete", then definition items relating to the management target (management target identified by the location 214 of the management target, type 215 of the management target, and management target identifier 216) designated in the editing instruction 21 are deleted (5103) from the management definition information 1333 (and the validity status definition information 1336), and processing returns to reception of the editing instruction 21.

When the type 213 of the editing function is not "delete", the content is checked to see whether it is "temporarily stop" (5104). If it is "temporarily stop", the definition item relating to the management target (same as in the case of "delete") designated in the editing instruction 21 in the definition information 1333 is invalidated (5105), and the processing returns to reception of the editing instruction 21.

Below similarly, when the content is "cancel temporary stop" (5106), the definition information relating to the designated management target is validated (5107).

When the content is "change the management target name" (5108), the management target name of the definition information relating to the designated management target is substituted with a new management target name stored in the options 217 in the editing instruction 21(5109).

When the content is "back up" (5110), the definition information relating to the designated management target is extracted and sent to the manager 11 (5111).

When the content is "restore" (5112), the definition information relating to the designated management target is received from the manager and registered in the management definition information 1333 (5113).

Although it is not specifically described in the flow charts of FIGS. 8 and 9, when the processing relating to the editing instruction 21 received from the manager 11 has ended, the manager 11 is notified of this (the fact that the processing has ended). In so doing, it becomes possible for the manager 11 to grasp the processing status of the agent 13 to prevent a situation where the processing of the agent 13 becomes confused by issuing the next editing instruction 21 regardless of whether the processing of the agent 13 has not ended.

The content of editing processing such as deletion and temporary stopping differs depending on the type of management tool 1332. Depending on the type of management tool 1332, a case is also conceivable where the changed content does not become valid simply by changing the content of the management definition information 1333 and function invocation of the management tool 1332 or restarting of the program of the management tool 1332 becomes necessary as additional processing. With respect to such a management tool 1332, necessary additional processing may be conducted after updating of the management definition information 1333. In the description of the present example, description in regard to this additional processing is omitted in order to prevent the description from becoming complicated.

Among the management tools 1332, there are also tools where information corresponding to invalid status definition information 1336 is unnecessary as in the backup scheduler described in Section 1.3(1).

As a means for "temporary stopping", other than the above, a method may be adopted where the (program of the) management tool 1332 is itself stopped. This method is particularly effective when stopping all management items of the management tool 1332.

Using the configuration of FIG. 2, the implementation status of the aforementioned six editing functions will be described below according to the type of management tool 1332.

1.4.1 Editing Functions for Backup Scheduler

As described in Section 1.3(1), the management definition information 1333-*a* of the backup scheduler 1334-*a*2 is included in the database and comprises five pieces: the task ID 311, the host name 312, the backup target 313, the backup condition 314 and validity 315. The management target 1331 of the backup scheduler 1334-*a*2 is the disk drive that is the backup target. The processing content will be described below according to the editing type of editing instruction 21.

(1) Execution of Deletion (Corresponding to Backup Scheduler)

When the type 213 of the editing function in the editing instruction 21 is content representing "delete", the record of the management target 1331 of deletion targets in the database is deleted.

Specifically, a record where "the item of the host name 312 of the record of the database matches the location 214 of the management target in the editing instruction 21 and the backup target 313 of the same record matches the management target identifier 216 in the editing instruction 21" is searched for, and the record matching the search condition is deleted.

(2) Execution of Temporary Stopping (Corresponding to Backup Scheduler)

When the type 213 of the editing function is content representing "temporarily stop", the record of the management target 1331 of the temporary stopping target in the database is invalidated.

Specifically, a record where "the item of the host name 312 of the record of the database matches the location 214 of the management target in the editing instruction 21 and the backup target 313 of the same record matches the management target identifier 216 in the editing instruction 21" is searched for, and the item of validity 315 of the record matching the search condition is set (changed) to "invalid".

(3) Execution of Cancellation of Temporary Stopping (Corresponding to Backup Scheduler)

Processing in a case where the type 213 of the editing function is content representing "cancel temporary stopping" is substantially the same as processing of the aforementioned "temporarily stop" except that the item of validity 315 is made "invalid" in the case of "temporarily stop" and made "valid" in the case of "cancel temporary stop".

(4) Execution of Changing the Management Target Name (Corresponding to Backup Scheduler)

When the type 213 of the editing function is content representing "change the management target name", a new management target name is included (by the editing instruction unit 1134) in the item of options 217 in the editing instruction 21.

Additionally, the processing content of "change the management target name" differs depending on whether the content of the type 215 of the management target in the editing instruction 21 is "host" or "disk drive". When the same content is "host", content where the item of the host name 312 matches the management target identifier 216 in the editing instruction 21 is searched for from the database, and the item of the host name 312 of the corresponding record is substituted with a new management target name included in the options 217 in the editing instruction 21. When the content of the type 215 of the managing target is "disk drive", the record of the database is searched for with the same conditions as in the case when the type 213 of the editing function is "delete", and the item of backup target 313 of the record matching the search condition is substituted with a new management target name included in the options 217 in the editing instruction 21.

As described above, in a case where another management target 1331 positioned at the direct parent (direct ancestor) of the management target 1331 of the management tool 1332 (in the case of the backup scheduler 1334-*a*2, this corresponds to the "disk drive"), it is necessary to correspond to changing the management target name (changing of the management target name) corresponding to the parent (direct ancestor).

(5) Execution of Backup (Corresponding to Backup Scheduler)

When the type 213 of the editing function is content representing "back up", the record of the database is searched with the same condition as in the case when type of 213 of the editing function is "delete", and the content of the record matching the search condition is sent to the manager 11. As for the format of the information sent to the manager 11, the content may be sent in a text format of one line one record or comma partition.

(6) Execution of Restoration (Corresponding to Backup Scheduler)

When the type 213 of the editing function is content representing "restore", a deletion flag and restoration content are included (by the editing instruction unit 1134) in the item of options 217 in the editing instruction 21.

The deletion flag is information for designating whether or not to delete the record before executing restoration. When the deletion flag is "delete", the record of the database is searched with the same condition as in the case when the type of 213 of the editing function is "delete", and the record matching the search condition is deleted. Thereafter, subsequent processing is executed regardless of the content of the deletion flag.

The restored content included in the item of options 217 is registered in the record of the database. With respect to this, processing corresponding to the reverse of the processing when the type 213 of the editing function is "back up" may be conducted. However, the item of the task ID 311 of the record may be a form to which a new ID is given and not a form included as it is in the restored content in order to avoid overlap with already existing content in the database.

1.4.2 Editing Functions for Host Operation Monitor

The management definition information 1333-$b1$ for the host operation monitor 1334-$b1$ is, as described in Section 1.3(2), stored in a text file, and the monitoring target host 321 and the status notification destination host 322 are included in one monitoring item as a one-line one monitoring item. The management target 1331 of the host operation monitor 1334-$b1$ is the host of the monitoring target.

It should be noted that, because there is no item corresponding to validity 315 in the management definition information 1333-$a$ of the backup scheduler 1334-$a2$, a function corresponding to the temporary stopping according to the embodiment of the invention cannot be implemented as it is. In order to solve this problem, an invalid status text file having the same data format as the text file is prepared, and the item of invalid status is sent to the invalid status text file from the text file.

The processing content will be described below according to the editing type of the editing instruction 21.

(1) Execution of Deletion (Corresponding to Host Operation Monitor)

When the type 213 of the editing function in the editing instruction 21 is content representing "delete", the line where the monitoring target host 321 matches the identifier 215 of the management target in the editing instruction 21 is deleted from the text file and the invalid status text file.

(2) Execution of Temporary Stopping (Corresponding to Host Operation Monitor)

When the type 213 of the editing function is content representing "temporarily stop", the line where the monitoring target host 321 matches the identifier 215 of the management target in the editing instruction 21 is searched for from the text file, and the line is moved to the invalid status text file. That is, a copy of the line is taken to the invalid status text file and the line is removed from the text file.

(3) Execution of Cancellation of Temporary Stopping (Corresponding to Host Operation Monitor)

When the type 216 of the editing function is content representing "cancel temporary stop", the line where the monitoring target host 321 matches the identifier 215 of the management target in the editing instruction 21 is searched for from the invalid status text file, and the line is moved to the text file. That is, a copy of the line is taken to the text file and the line is removed from the invalid status text file.

(4) Execution of Changing the Management Target Name (Corresponding to Host Operation Monitor)

When the type 216 of the editing function is content representing "change the management target name", a new host name is included (by the editing instruction unit 1134) in the item of options 217 in the editing instruction 21. In the text file and the invalid status text file, the portion where the monitoring target host 321 matches the identifier 215 of the management target in the editing instruction 21 is substituted with a new host name in the options 217.

(5) Execution of Backup (Corresponding to Host Operation Monitor)

When the type 216 of the editing function is content representing "back up", the content of the line where the monitoring target host 321 matches the identifier 215 of the management target in the editing instruction 21 is sent to the manager 11 from the text file and the invalid status text file. As for the format in which the content is sent to the manager 11, the format described in the text file is fine as it is, but both files are sent as separate files so that the contents of the text file and the invalid status text file can be distinguished.

(6) Execution of Restoration (Corresponding to Host Operation Monitor)

When the type 216 of the editing function is content representing "restore", a deletion flag and the restored content of the text file and the invalid status text file are included (by the editing instruction unit 1134) in the item of options 217 in the editing instruction 21. When the deletion flag is "delete", the line where the monitoring target host 321 matches the identifier 215 of the management target in the editing instruction 21 is deleted from the text file and the invalid status text file. Thereafter, the restored content included in the item of options 217 is added to the text file and the invalid status text file regardless of the content of the deletion flag.

1.4.3 Editing Functions for Disk Reporter

The management definition information 1333-$b2$ of the disk reporter 1334-$b2$ is, as described in Section 1.3(3), included in the database and comprises the host name 331, the measurement item 332 and the measurement target 333. The management target 1331 of the disk reporter 1334-$b2$ is a disk drive that is also the measurement target of the disk monitor 1331-$c$.

It should be noted that, because there is no item corresponding to validity 315 in the management definition information 1333-$a$ of the backup scheduler 1334-$a2$, a function corresponding to the temporary stopping according to the embodiment of the invention cannot be implemented as it is. In order to solve this problem, an invalid status text file that can record the item of the management definition information 1333-$b2$ is prepared, and the item of invalid status is sent to the invalid status text file from the text file.

Although an invalid status data retention table having the same structure as the management definition information 1333-$b2$ may be created as an alternative therefor, in the present example, it will be described with a method using the invalid status text file.

Processing content will be described below according to the editing type of the editing instruction 21.

(1) Execution of Deletion (Corresponding to Disk Reporter)

When the type 216 of the editing function in the editing instruction 21 is content representing "delete", the record where the item of the host name 331 of the record of the database matches the location 214 of the management target in the editing instruction 21 and the measurement target 333 of the same record matches the management target identifier 216 in the editing instruction 21 is searched for, and the record matching the search condition is deleted. With regard also to the invalid status text file, the line matching the condition in the same region as the record deletion of the database is deleted.

(2) Execution of Temporary Stopping (Corresponding to Disk Reporter)

When the type 216 of the editing function is content representing "temporarily stop", the record of the database is searched with the same condition as the content described in the execution of deletion (corresponding to the disk reporter), the content of the record matching the search condition is added to the invalid status text file, and the record matching the search condition is deleted.

(3) Execution of Cancellation of Temporary Stopping (Corresponding to Disk Monitor)

When the type 216 of the editing function is content representing "temporarily stop", the reverse operation of "execution of temporary stopping" is conducted. That is, the corresponding line is searched for from the content of the invalid status text file under the same condition as the content described in the execution of deletion (corresponding to the disk reporter), the corresponding line is added to the record of the database, and then the corresponding line in the invalid status text file is deleted.

(4) Execution of Changing the Management Target Name (Corresponding to Disk Reporter)

When the type 216 of the editing function is content representing "change the management target name", a new management target name is included (by the editing instruction unit 1134) in the item of options 217 in the editing instruction 21. The processing content of "changing of the management target name" differs depending on whether the content of the type 215 of the management target in the editing instruction 21 is "host" or "disk drive".

When the same content is "host", the content where the host 331 matches the management target identifier 216 in the editing instruction 21 is searched for from the database, and the item of the host 331 of the corresponding record is substituted with a new management target name included in the options 217 in the editing instruction 21. Similarly, with regard also to the invalid status text file, searching for the corresponding line and substitution with a new management target name are conducted.

When the content of the type 215 of the management target is "disk drive", the record of the database is searched under the same condition as in the case when the type 216 of the editing function is "delete", and the item of the measurement target 333 of the record matching the search condition is substituted with a new management target name included in the options 217 in the editing instruction 21. Then, with regard also to the invalid status text file, similar management target name substitution processing is conducted.

(5) Execution of Backup (Corresponding to Disk Reporter)

When the type 216 of the editing function is content representing "back up", the record of the database is searched under the same condition as the case where the type 216 of the editing function is "delete", and the content of the record matching the search condition is sent to the manager 11. After that, the content of the invalid status text file is also sent to the manager 11.

(6) Execution of Restoration (Corresponding to Disk Reporter)

When the type 216 of the editing function is content representing "restore", a deletion flag and the restored content (the content of the record of the database and the content of the invalid status text file) are included (by the editing instruction unit 1134) in the item of options 217 in the editing instruction 21.

When the deletion flag is "delete", the record of the database is searched under the same condition as the case where the type 216 of editing function is "delete", and the record matching the search condition is deleted. With regard also to the invalid status text file, the corresponding line is similarly deleted. Thereafter, subsequent processing is executed regardless of the content of the deletion flag.

The content portion of the record of the database of the restored content included in the item of the options 217 is registered in the record of the database, and the content portion of the invalid status text file of the restored content is added to the invalid status text file.

1.4.4 Editing Functions for Disk Monitor

The management definition information 1333-*c* of the disk monitor 1331-*c* is, as described in Section 1.3(4), included in the database and comprises the measurement item 341, the measurement target 342 and the warning condition 343. The management target 1331 of the disk monitor 1331-*c* is a disk drive. With respect to the disk monitor 1331-*c*, similar to the disk reporter 1334-*b2*, an invalid status text file is prepared because there is no item in the management definition information 1333 corresponding to the validity 315 in the management definition information 1333-*a*. The processing content will be described below according to the editing type of the editing instruction 21.

(1) Execution of Deletion (Corresponding to Disk Reporter)

When the type 216 of the editing function in the editing instruction 21 is content representing "delete", the record where the measurement item 342 of the record of the database matches the management target identifier 216 in the editing instruction 21 is searched for, and the record matching the search condition is deleted. With regard also to the invalid status text file, the line matching the condition in the same region is deleted.

(2) Execution of Temporary Stopping (Corresponding to Disk Monitor)

When the type 216 of the editing function is content representing "temporarily stop", the record of the database is searched under the same condition as the content described in the execution of deletion (corresponding to the disk monitor), the content of the record matching the search condition is added to the invalid status text file, and the record matching the search condition is deleted.

(3) Execution of Cancellation of Temporary Stopping (Corresponding to Disk Monitor)

When the type 216 of the editing function is content representing "cancel temporary stop", the corresponding line is searched for from the content of the invalid status text file under the same condition as the content described in the execution of deletion (corresponding to the disk reporter), the corresponding line is added to the record of the database, and then the corresponding line in the invalid status text file is deleted.

(4) Execution of Changing the Management Target Name (Corresponding to Disk Monitor)

When the type 216 of the editing function is content representing "change the management target name", a new disk drive name is included (by the editing instruction unit 1134) in the item of options 217 in the editing instruction 21. The record of the database is searched for under the same condition as the case where the type 216 of the editing function is "delete", and the item of the measurement target 342 of the record matching the search condition is substituted with a new management target name included in the options 217 in the editing instruction 21. With regard also to the invalid status text file, similar management target name substitution processing is conducted.

(5) Execution of Backup (Corresponding to Disk Monitor)

When the type 216 of the editing function is content representing "back up", the record of the database is searched under the same condition as the case where the type 216 of the editing function is "delete", and the content of the record matching the search condition is sent to the manager 11. After that, the content of the invalid status text file is also sent to the manager 11.

(6) Execution of Restoration (Corresponding to Disk Monitor)

When the type 216 of the editing function is content representing "restore", a deletion flag and the restored content (the content of the record of the database and the content of the invalid status text file) are included (by the editing instruction unit 1134) in the item of options 217 in the editing instruction 21.

When the deletion flag is "delete", the record of the database is searched under the same condition as the case where the type 216 of editing function is "delete", and the record matching the search condition is deleted. With regard also to the content of the invalid status text file, the corresponding line is similarly deleted. Thereafter, subsequent processing is executed regardless of the content of the deletion flag.

The content portion of the record of the database of the restored content included in the item of the options 217 is registered in the record of the database, and the content portion of the invalid status text file of the restored content is added to the invalid status text file.

1.5 Status Monitoring Unit

The status monitoring unit 1335 is realized by software (a program) stored in the storage device 133 being read into the memory 132 and executed by the CPU 131. It should be noted that the status monitoring unit 1335 itself may be a (single) management tool 1332. Additionally, the software of the status monitoring unit 1335 may also be stored in a location other than the storage device 133 if it is implementable in the agent 13.

The main role of the status monitoring unit 1335 is to monitor the status of the management target and, when the management target 1331 has stopped or the management target 1331 itself has ceased to exist, to notify the change detection unit 1135 in the manager 11 of this. It should be noted that if the function of automatically changing the definition of the management item in association with a change in the status of the management item 1331 is unnecessary, the status monitoring unit 1335 does not need to be present.

In the configuration of FIG. 2, the host operation monitor 1334-*b*1 corresponds to the status monitoring unit 1335. The status monitoring unit 1335 monitors the status of the agent (hostT) 13-*c* and, when a change in the status is detected, fulfills the role of issuing a notification to the manager (hostM) 11. As in the example, the status monitoring unit 1335 can be handled as one type of management tool 1332.

2. Manager

The manager 11 is an information processing device and can activate a program stored in the storage device 133 using the CPU 111 and the memory 112, provide information to the user of the manager 11 using the display 115, and receive instructions from the user of the manager using a keyboard 116 and a mouse 117. Moreover, the manager 11 can exchange information with the agent 13 using the communications I/F 114. The constituent elements in the manager 11 pertaining to the essence of the embodiment are a user I/F unit 1131, management target information 1132, management definition BU (backup) data 1133, the editing instruction unit 1134, and the change detection unit 1135.

It should be noted that, in the realization of FIG. 1, although the constituent elements in the storage device 113 in the manager 11 are realized in a form where they are all present in the manager 11, they may also be in a location other than the manager 11 as long as communication is possible between these constituent elements. The relationship between the constituent elements is as follows.

An instruction from the user of the manager 11 is received by the user I/F unit 1131 and conveyed to the editing instruction unit 1134. The change detection unit 1135 instructs the editing instruction unit 1134 on the basis of the notification sent from the status monitoring unit 1335 in the agent. The editing instruction unit 1134 references the management target information 1132 on the basis of the instruction from the user I/F unit 1131 or the change detection unit 1135 and issues an instruction with respect to the editing execution unit 1334 in the agent 13. The editing instruction unit 1134 appropriately sends the content of the management definition BU (Back Up) data 1133 to the agent 13 and stores the content of the management definition information 1333 sent from the agent 13 in the management definition BU (Back Up) data 1133. Detailed description of the constituent elements in the manager 11 will be conducted below.

2.1 Management Target Information

The management target information 1132 is data representing the management status of the management target 1331 and includes information representing the management status of the management tool 1332 for each management target 1331 (operations management information 36) and information representing the configuration of the management target (management target configuration information 35). In the configuration of FIG. 1, the file location of the management target information 1132 is in the storage device 113 in the manager 11, but it may also be in another location as long as it is a location that can be referenced from the editing instruction unit 1134 or the user I/F unit 1131.

The main role of the management target information 1132 is to retain information relating to the configuration and management status of the management target 1331. The content of the management target information 1132 is management target configuration information 35 and operations management information 36.

(1) Management Target Configuration Information

Figure 10:
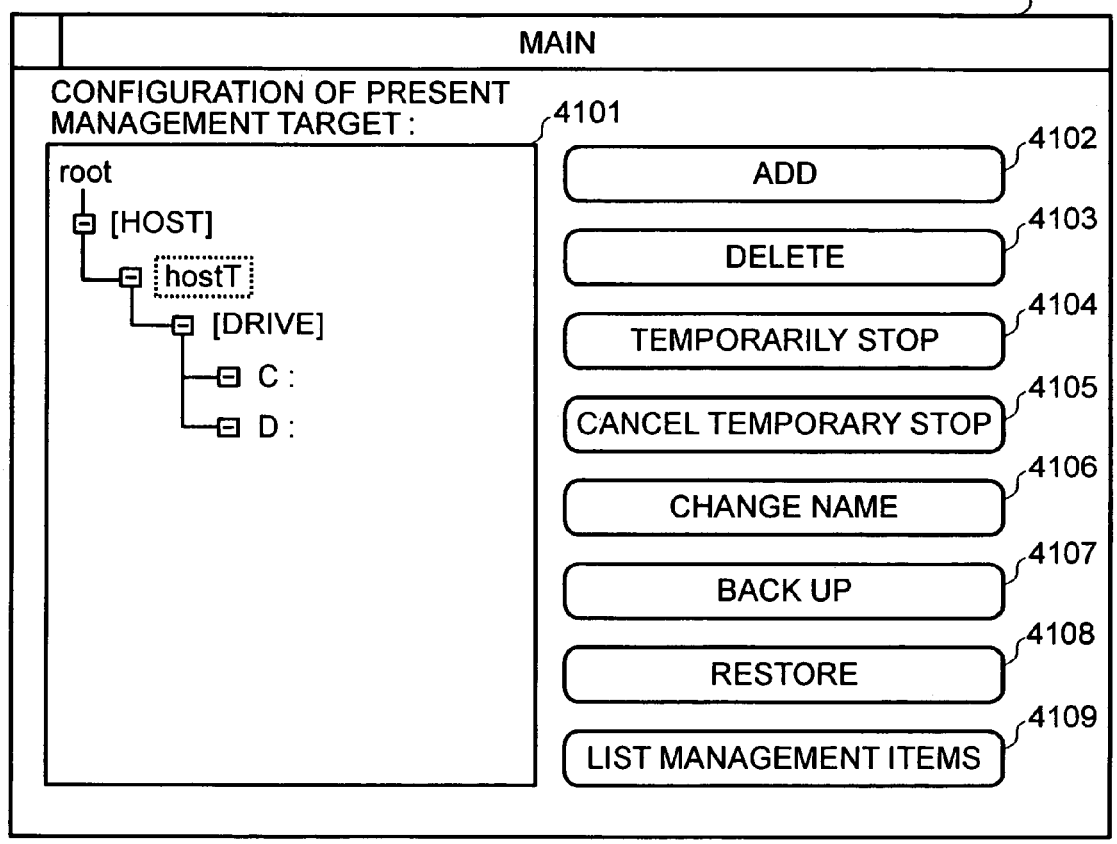
FIG. 10 is a diagram showing an example of a main screen of a user I/F unit.

The management target configuration information 35 represents the parent-child relationship of the management target 1331, and is information of one set (=one line) in a pair comprising a management target 1331 corresponding to the child and a management target 1331 corresponding to a parent. A tree structure such as represented by configuration 4101 of the management target shown in FIG. 10 is configured by a combination of the parent-child relationship of the management targets 1331.

FIG. 13 is an example of the configuration of the management target configuration information 35. Each management target is defined by the three items of the type of management target, the identifier of the management target and the location of the management target. For example, in the table of FIG. 13, in the information of the second line (where the identifier of the management target corresponding to the child is "C:"), the management target corresponding to the child is the identifier "C:", the type is "drive" and the location is "hostT", and the management target corresponding to the parent is identifier "hostT", the type is "host" and the location is "–" (Root). In addition, this child-parent relationship also shows the dependency between management targets. A child management target cannot exist without a parent management target. Therefore, the child management target can be called management target depending on the parent management target.

(2) Operations Management Information

The operations management information 36 represents which management tool is used to manage the management target 1331. FIG. 14 is an example of the operations management information 36. The operations management information 36 is configured by information identifying the management target and information identifying the management tool.

The information identifying the management target consists of the three items of the identifier, type and location of the management target. The information identifying the management tool includes the two items of the type of management tool and the location in which the management tool is placed, and also includes, as supplementary information, information representing the validity of the management tool.

One line in FIG. 14 corresponds to information of one set. For example, in the second line of the table, the management target 1331 where the identifier equals "C:", the type equals "drive" and the location equals "hostT" is managed by the management tool "disk monitor" in the "hostT", and represents the fact that management status is valid.

2.2 Management Definition BU Data

The management definition BU (backup) data 1133 is preliminary data of the management definition information 1333. In the configuration of FIG. 1, the file location of the management definition BU (backup) data 1133 is inside the storage device 113 in the manager 11, but it may also be another location as long as it is location that can be referenced from the editing instruction unit 1134 or the user I/F unit 1131.

The original data of the management definition BU (backup) data 1133 is the management definition information 1333 and the invalid status definition information 1336 in the agent 13, sent to the manager 11 by the editing execution unit 1334, and the content thereof is stored in the storage device 113. The management definition BU data 1133 classifies information by the management target 1331, the type of management tool 1332 and the validity/invalidity of the management definition information, and may be stored in a form such as a file.

In order to make it easy to store the backup data in the management definition BU data 1133, a backup data management table 37 is retained inside the storage device 113 (see FIG. 15). The backup data management table 37 includes the items of a backup ID 371, (information for discriminating; third item) a management target 372, (information for discriminating; second item) a management tool 373, a data storage destination file name 374 and the date and time of creation 375.

The backup ID 371 is for collecting plural backup data, and attaches one identifier name with respect to backup data created by a one-time backup operation instructed by the user of the manager 11. The backup ID 371 may be named by an instructed from the user, or the editing instruction unit 1134 may automatically give a unique name thereto. The management target 372 and the management tool 373 are information for discriminating the target of the backup data. The data storage destination file name 374 is a file name serving as the storage destination of the corresponding backup data, and describes two pieces of information: management definition information in a valid status (backup data of the management definition information 1333) and management definition information in an invalid status (backup data of the invalid status definition information 1336). The date and time of creation 375 records the date and time at which the corresponding backup data was created, and is used to distinguish old and new backup data.

2.3 User I/F Unit

The user I/F unit 1131 is realized by software (a program) stored in the storage device 113 being read into the memory 112 and executed by the CPU 111. It should be noted that the software of the user I/F unit 1131 may also be stored in a location other than the storage device 113 as long as it can be executed inside the manager 11. The main role of the user I/F unit 1131 is to receive instructions, such as changing the definition information per management target and changing the content of the management definition information 1132, from the user of the manager 11 via the keyboard 116 or the mouse 117, and displaying the content of the management target information 1132 and the operational status of the functions the embodiment provides with respect to the user of the manager 11 via the display 115 or the like.

FIG. 10 is an example of a main screen 41 of the user I/F unit 1131, and is content displayed on the display 115 or the like (the same is true of the following screen). The main screen 41 is for the user to confirm the configuration of the management target 1331 and designate the management target 1331 serving as the management target and the content of operation. In the configuration 4101 of the management target in the main screen 41, the configuration and type of each management target 1331 are expressed. Items enclosed by brackets represent the type of management target 1331 and other items represent the identifier of the management target 1331.

Parent-child relationships are also expressed by the positions of the items. For example, the fact that there is the management target 1331 of "host" of the name "hostT" and the fact that there are management targets 1331 of "C:" and "D:" "drives" as management targets 1331 corresponding to the children thereof are represented (the displayed content of FIG. 10 is an example where the configuration of FIG. 2 is displayed).

The original data of the content displayed in the configuration 4101 of the management target is the management target configuration information 35 included in the management target information 1132. Each item in the configuration 4101 of the management target is selectable, and by pressing function buttons (4102 to 4109) vertically lined at the right side, the content of operations with respect to the management target 1331 is designated.

Part of the operations on this screen is associated with the editing instruction unit 1134. For example, when "hostT" is selected in the configuration 4101 of the management target and a delete button 4103 is pushed, the editing instruction unit 1134 is instructed to delete the management target "hostT". Similarly, a temporary stop button 4104, a cancellation of temporary stop button 4105, a name change button 4106 and a backup button 4107 are also associated with the editing instruction unit 1134.

An add button 4102 is for adding a management target 1331. When the management target 1331 corresponding to the parent is selected in the configuration 4101 of the management target and the add button 4102 is pushed, a screen prompting input of the type and identifier of the management target 1331 is displayed, and the user of the user I/F unit 1131 inputs these items. The inputted items are registered in the management target configuration information 35 and the displayed content of the configuration 4101 of the management target is updated, whereby the management target 1331 is added and registered.

A restore button 4108 is, as the name implies, for conducting restoration of the backed-up management definition information 1333. When this button is pushed, a list of backed-up management definition information 1333 (and invalid status definition information 1334) is displayed, a backup target is selected, and an instruction to restore is conducted with respect to the editing instruction unit 1134.

Moreover, the embodiment may also be configured so that a management target itself is added or deleted when the add button 4102 or the delete button 4103 is pushed on the screen of FIG. 10. To describe using the system configuration of FIG. 20, under this configuration, the drives (which are one management target) are allocated logic volumes on the storage device 14 and can be optionally added or deleted using the drive disposition tool 1336-3.

Figure 21:
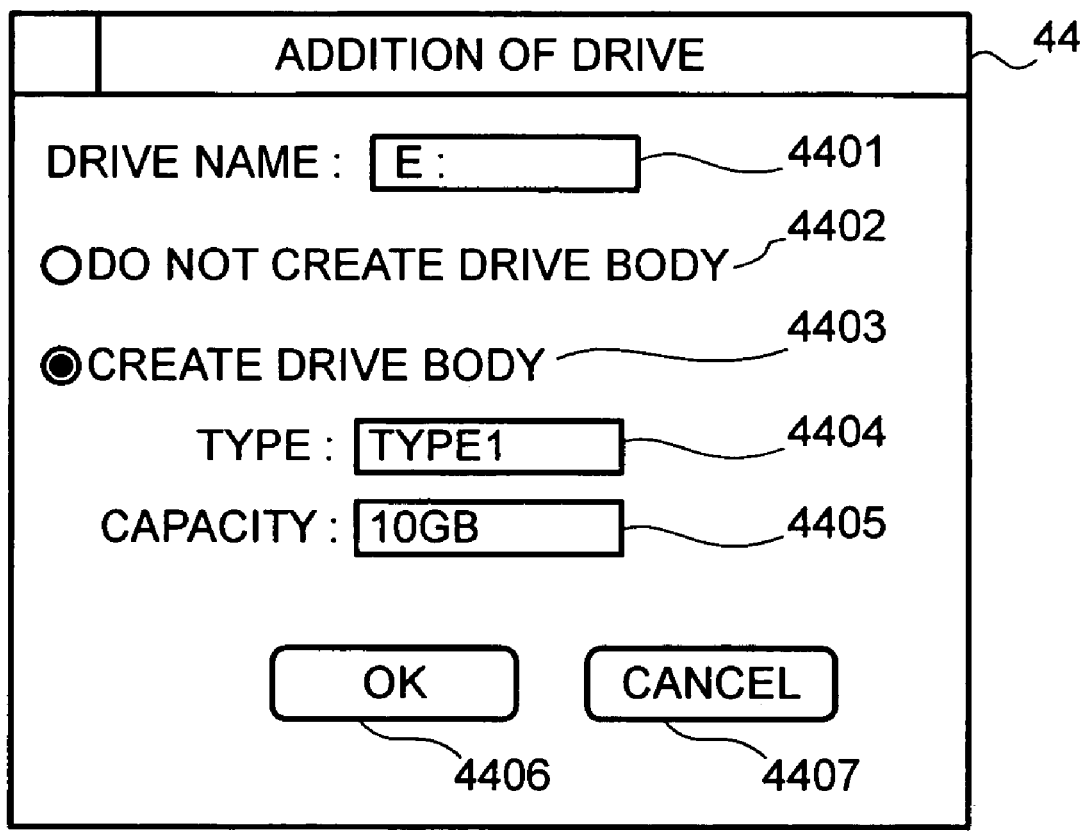
FIG. 21 is a diagram showing an example of a setting screen at the time of drive addition.

Using this point, the embodiment may be configured so that, when the add button 4102 on the same screen is pushed in a state where "drive" is selected in the configuration 4101 of the management target on the screen of FIG. 10, a drive itself is added. In this case, the embodiment may be configured so that the user can designate a profile of the drive to be added using the screen of FIG. 21. In order to accommodate a case not always limited to the desire to create a drive itself, the embodiment may be configured so that the user can select whether or not to create a drive itself. Moreover, when a drive is to be created, the embodiment may be configured so that the user can input a class 4404 and a capacity 4405 of the drive to be created. When 4403 for creating the body of a drive is selected on the screen and an OK button 4406 is pushed, an instruction is sent with respect to the drive disposition tool 1336-3 on the basis of the information designated on the screen, whereby addition of a logic volume and allocation of the drive are conducted.

Processing when the delete button 4103 is pushed on the screen of FIG. 10 is the same as the case of addition. That is, the embodiment may be configured so that, when the user is prompted to select whether or not to delete a drive itself and the desire to delete drive itself is designated by the user, an instruction is sent with respect to the drive disposition tool 1336-3, whereby deletion of the logic volume and allocation cancellation of the drive are conducted.

Figure 12:
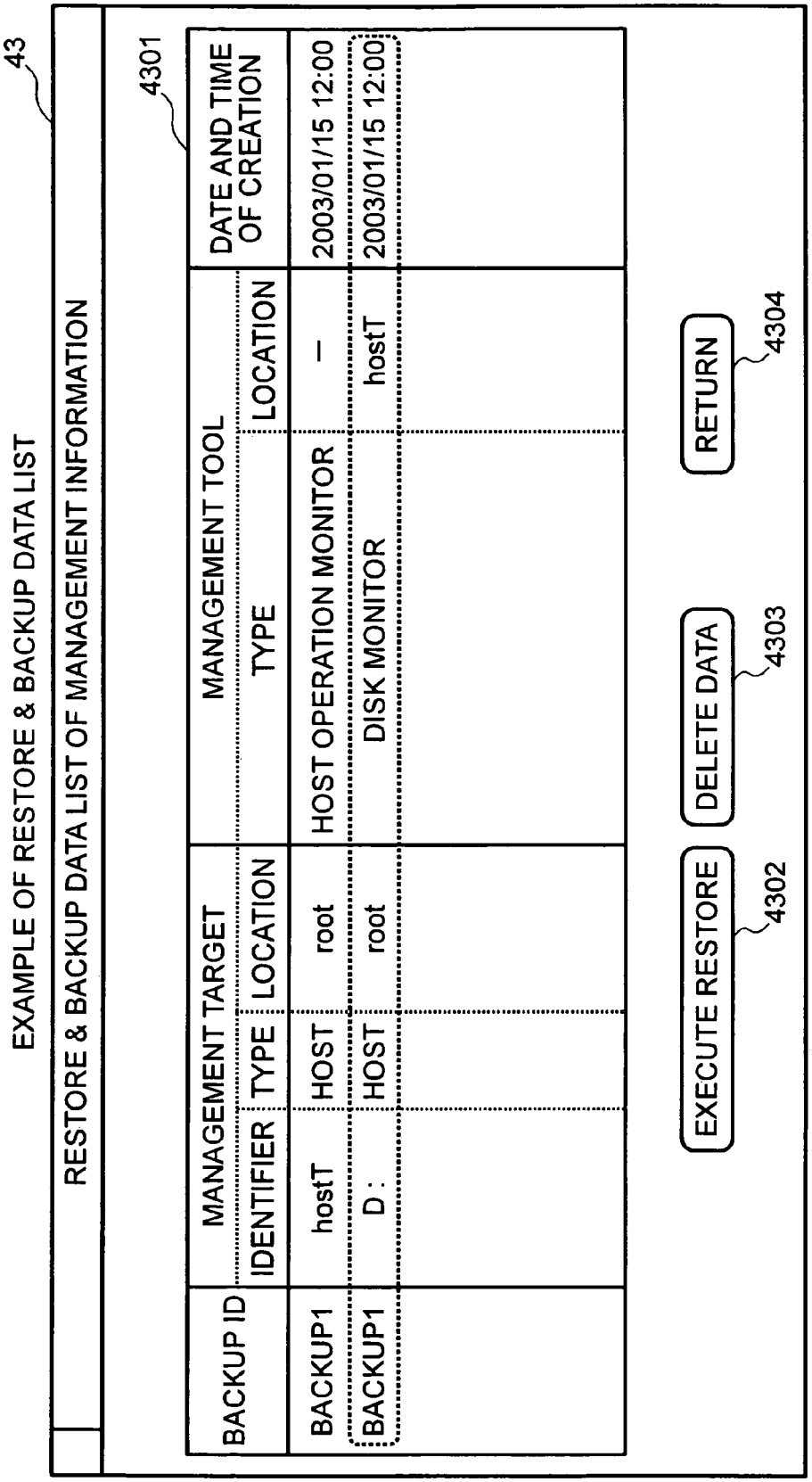
FIG. 12 is a diagram showing an example of a restore & back up data list screen.

FIG. 12 is an example of a screen 43 representing a list of backed-up management definition information 1333 and configured so that part of the backed-up management definition information 1333 can be deleted in addition to restoration execution. When a restoration execution button 4302 is pushed on the screen, a restore instruction is conveyed to the editing instruction unit 1134. It should be noted that the original data of the list of backed-up management definition information 1333 is the backup data management table 37 (see FIG. 15), and necessary items may be removed from the same management table and displayed on the screen. In the example of FIG. 12, information other than the file storage destination name of the backup data management table 37 is displayed.

A management item list button 4109 in the main screen 41 (FIG. 10, in the main screen 41) is for confirming and editing details of the management status relating to a specific management item 1331 selected in the configuration 4101 of the management target. When the same button is pushed, a management item screen 42 per management target is displayed (see FIG. 11).

A management status list 4202 in the management item screen 42 per management target represents which management tool is used to manage a management target 1331 described in a management target 4201. By selecting the management tool, the management item that the management tool has is selected.

Figure 11:
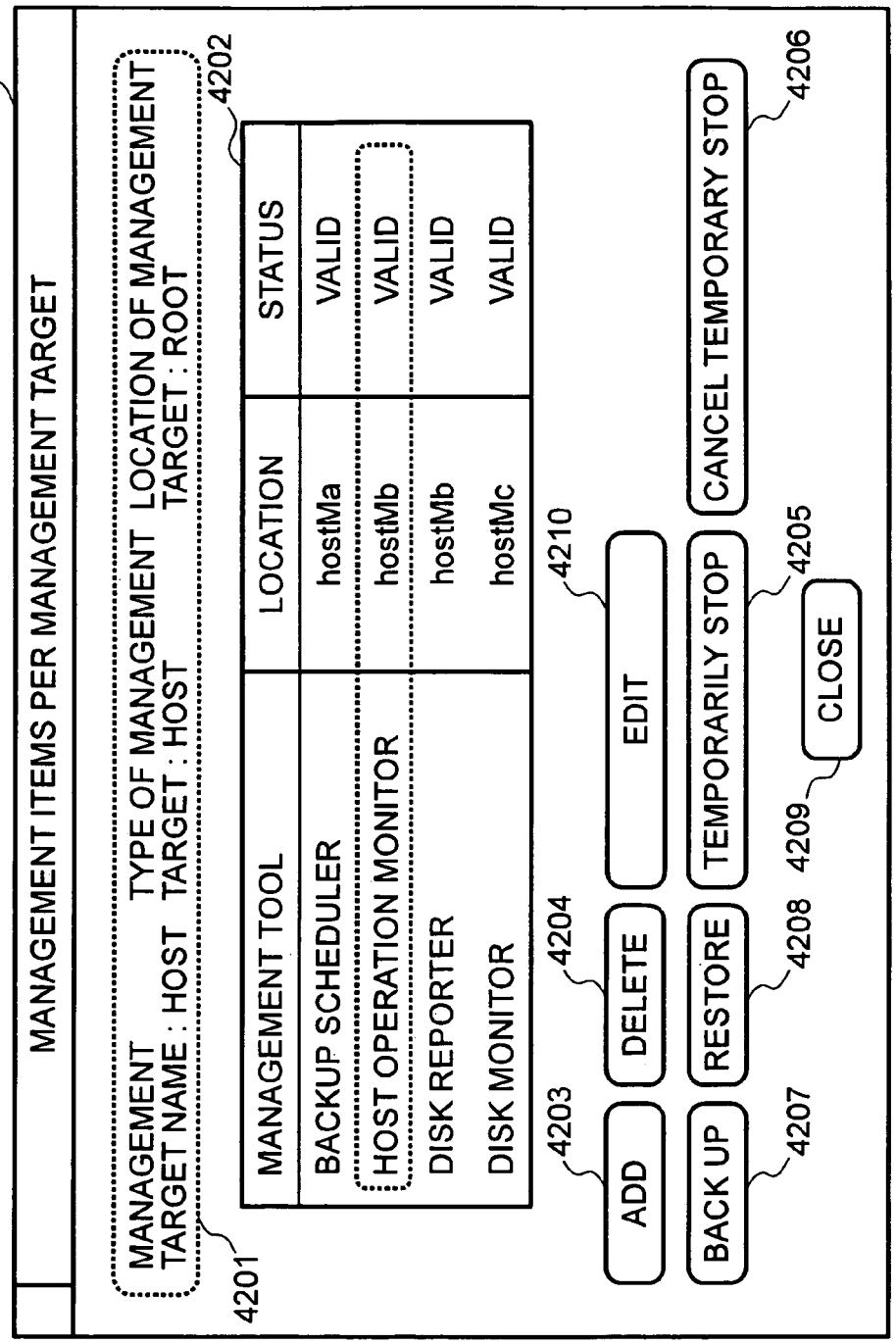
FIG. 11 is a diagram showing an example of a management item screen per management target.

In the example of FIG. 11, the fact that the "hostT" host is managed by a total of four management tools such as the management tool "backup scheduler" in the "hostMa" is represented. It should be noted that the information displayed in the management status list 4202 is acquired from the operations management information 36 in the management target information 1132. Function buttons (4203 to 4209) are disposed below the management item list 4202 of the "management item screen per management target 42".

An add button 4203 is for selecting a management item with respect to the corresponding management target, and the user may be prompted to input the class, location and management status of the management tool so that the inputted information is added to the operations management information 36.

Moreover, the embodiment may also be configured so that the content itself of the management item can be simultaneously designated at this time. For example, if it is a management tool having a scheme where a management item is defined by the form of a file, a file editing program such as a text editor may be activated so that the user directly edits the management item, or a program where the management item is inputted and directly written to a definition file may be created and called. Also, because there are cases where an independent management item setting program is provided depending on the class of management tool, the add button 4203 may be pushed in that case and the type and location of the management tool may be inputted, and then the management item setting program may be called.

A function for editing only the content of the management item may also be disposed in association with the adding function of the content itself of the management item. In a case where an edit button 4210 is disposed in the screen of FIG. 11 and this button is pushed, a scheme for calling a text editor or a management tool-specific management item setting program is imparted similar to the case of addition.

The delete button 4204 acts in association with the functions of the editing instruction unit 1134. Also, the management tools in the management item list 4202 are optionally selectable, and by selecting a management tool, the management item that the management tool has is selected.

When the delete button 4204 is pushed after item selection (i.e., after selection of the management tool), an instruction of deletion with respect to the corresponding management item is conveyed to the editing instruction unit 1134. The embodiment may be configured so that the content itself of the management item is also deleted at this time. For example, if it is a management tool taking a form where a management item is defined by the form of a file, the corresponding place of the management item included in the file may be directly deleted.

With regard also to the temporary stop button 4205, the cancellation of temporary stop button 4206 and the backup button 4207, an instruction of an editing operation is conveyed to the editing instruction unit 1134 similar to the delete button 4203.

When the restore button 4208 of the "management item screen per management target 42" is pushed, a list of backup data relating to the corresponding management item 1331 is displayed on a screen similar to FIG. 12. The content displayed on this screen is obtained by extracting necessary information from the backup data management table 37.

In this screen, optional backup data is selected and the restore execution button 4302 is pushed, whereby restoration can be executed. Execution of restoration is conducted by conveying a restoration instruction to the editing instruction unit 1134. Also, using the data delete button 4303, backup data displayed in the backup data list 4301 can be deleted. The result of the deletion operation conducted here is reflected in the backup data management table 37. In this manner, in the user I/F unit 1131, information presentation with respect to the user and exchange of instructions from the user are conducted.

In the above-described example, a GUI (Graphical User Interface) was used, but it can also be realized in the form of a CLI (Command Line Interface) of a test base. In the CLI, a command is used in place of a button, and designation of the management target 1331 or the like is conducted with the argument of the command. For example, the host "hostT" may be selected on the screen shown in FIG. 10 and "delete resource host:hostT@root" may be instructed as a command sentence corresponding to an operation at the case where the delete button 4103 is pushed. The items of the commands are "delete" representing the type of editing operation, "resource" representing the target of the editing operation, "host" representing the type of the management target serving as the target, "hostT" representing the identifier of the same management target, and "root" representing the location of the same management target. Other editing operations such as changing the name of the management target can be implemented by substituting the functions of the GUI in the same region with the CLI.

2.4 Editing Instruction Unit

The editing instruction unit 1134 is realized by software (a program) stored in the storage device 113 being read into the memory 112 and executed by the CPU 111. It should be noted that the software of the editing instruction unit 1134 may also be stored in a location other than the storage device 113 as long as it can be executed in the manager 11.

The main role of the editing instruction unit 1134 is to use the reception of a processing instruction relating to the management target 1331 or the management definition BU data 1133 from the user I/F unit 1131 or the change detection unit 1135 to send a processing instruction of definition information to the agent 13 on the basis of the content of the management target information 1132, send the information in the management definition BU data 1134 to the agent 13, receive the content of the management definition information 1333 from the agent 13 and save the content in the management definition BU data 1134.

Among the processing instructions that the editing instruction unit 1134 receives are editing operations with respect to the management target 1331, operations with respect to specific management definition information 1333 (and invalid status definition information 1336) relating to the management target 1331, and restoration operations from the management definition BU data 1133.

2.4.1 Editing Operations with respect to Management Target

These are for conducting deletion, temporary stopping, cancellation of temporary stopping, name changing, and data backup for each management target 1331 unit, and are processing corresponding to processing instructions stemming from and generated by operations on the main screen 41 of the user I/F unit 1131.

(1) Deletion of Management Target

Processing with respect to an instruction to delete a specific management target 1331 will be described together with the flow chart shown in FIG. 16. It should be noted that description of processing when an error has occurred is omitted from the flow chart.

When the editing instruction unit 1134 receives the deletion instruction, it is checked whether or not there is a management target 1331 corresponding to the direct child of the management target 1331 serving as the deletion target (5202). Because information representing parent-child relationships between management targets 1331 is included in the management target configuration information 35, this information is referenced, whereby the presence or absence of a management target 1331 corresponding to the child can be determined. If there is a management target 1331 corresponding to the direct child, processing of deletion (5201) relating to the management target 1331 corresponding to the direct child is called (5203). This invocation format is so-called recursive calling, and in the deletion processing of the management target 1331 corresponding to the child, if there is a management target 1331 corresponding to the child, deletion processing with respect thereto is conducted and calling of the deletion processing is continued until the management target corresponding to the child ceases to exist. Of course, if there are plural management targets 1331 corresponding to the direct child, calling of the deletion processing relating to the plural management targets 1331 may be conducted. The above-mentioned processing in which a child management target is deleted can also be called processing which deletes the management target depending on the management target for deletion.

Next, management items conducted with respect to the management target 1331 serving as the deletion target are listed (5204). Because management items with respect to a specific management target 1331 are managed by the operations management information 36, this information can be referenced and listed.

As subsequent processing, the item at the top of the list is selected (5205). Then, a deletion instruction relating to the selected item is issued with respect to the editing execution unit 1334 corresponding to the item (5206). Because information relating to the type and location of the management tool corresponding to the item is included in the operations management information 36 (see FIG. 14), the editing execution unit 1334 of the issuance destination of the deletion instruction may be identified from this information.

Next, notification of the end of processing from the editing execution unit 1334 is waited upon (5207). This waiting is conducted in order to prevent processing from becoming confused due to issuing plural editing instructions 21 at the same time to the editing execution unit 1334. In a case where processing of the editing execution unit 1334 is not particularly confused through disposing the ability to process a waiting queue of the editing instructions 21, processing may proceed to subsequent processing without conducting this waiting.

Next, information corresponding to the selected item is deleted from the operations management information 36 (5208). Next, it is checked whether or not a next item is present in the list (5209). If there is a next item, that item is selected (5210) and processing returns to the processing of 5206. If there is no next item, information of the management target 1331 serving as the deletion target is deleted from the management target configuration information 35 (5211), and processing ends.

(2) Temporary Stopping of the Management Target

The flow of processing when an instruction relating to temporary stopping of the management target is received is basically the same as processing when an instruction relating to deletion described above is received. The outline of the processing is as follows.

It is checked whether or not there is a management target 1331 corresponding to the direct child of the management target 1331 serving as the target of temporary stopping. If there is a management target 1331 corresponding to the child, temporary stopping processing with respect thereto is called. Then, management items relating to the management target 1331 are listed, issuance of an editing instruction 21 to the editing execution unit 1334 is conducted with regard to the management items, and the "status" column of the corresponding management item of the operations management information 36 is changed to "invalid". In contrast to the case of deletion, updating of the management target configuration information 35 is not conducted.

(3) Cancellation of Temporary Stopping of Management Target

The flow of processing when an instruction relating to cancellation of the temporary stopping of the management target is received is basically the same as the case of the temporary stopping instruction. The differences are that "cancellation of temporary stopping", and not "temporary stopping", is called when there is a management target 1331 corresponding to the child of the corresponding management target 1331, the content of the instruction issued to the editing execution unit 1334 is "cancellation of temporary stopping" and not "temporary stopping", and the updated content of the operations management information 36 is changed to "valid" and not "invalid".

(4) Changing Name of Management Target

The instruction relating to changing the name of the management target will be described below as something conducted after the management target 1331 has been transferred. The flow of processing when an instruction relating to changing the name of the management target is received resembles the case of the deletion instruction but is partially different.

Figure 16:
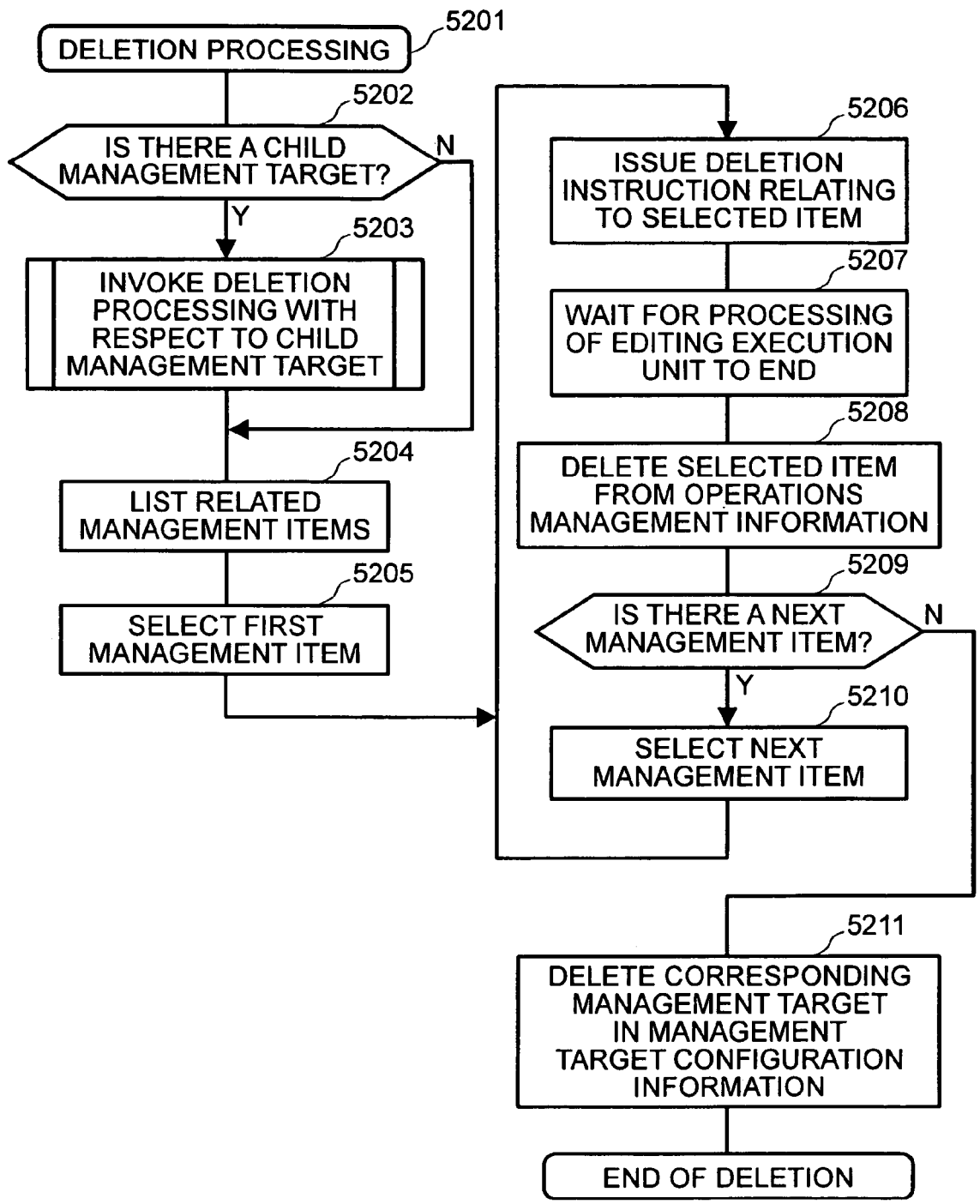
FIG. 16 is a diagram showing a flow chart of processing of the editing instruction unit with respect to deletion.
Figure 17:
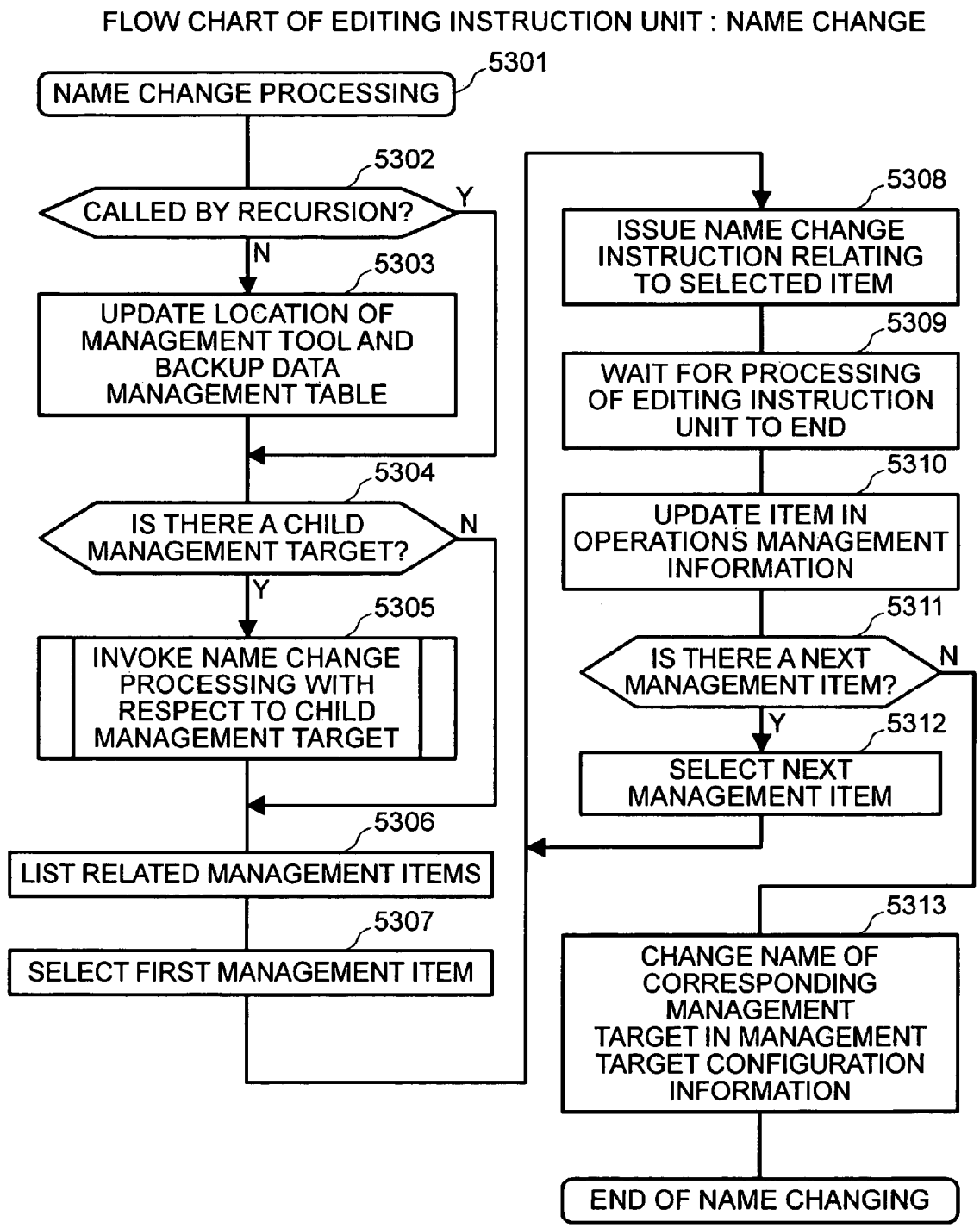
FIG. 17 is a diagram showing a flow chart of processing of the editing instruction unit with respect to name changing.

FIG. 17 is a flow chart (53) of processing relating to "name changing" that the editing instruction unit conducts, but in contrast to the case of "deletion" of FIG. 16, processing that adjusts the location of the management tool 1332 is conducted at the outset of the processing (5301, 5302). This corresponds to the location of the management tool 1332 being changed by changing the name of the management target 1331.

Information relating to the location of the management tool 1332 is included in the operations management information 36, and sometimes that information is affected by changing the name of the management target 1331. For example, in a case where the name of the management target 1331 whose type is "host" and whose identifier is "hostT" is changed to "hostT2", the identifier "hostT" of the management target 1331 corresponding to the change target is included in the "location" column of the management tools of the second (second line of the content) and the fifth (same) items in the example of FIG. 14. This represents that the management tool itself is a transfer (name change) target, and the corresponding place (place where the item of the location of the management tool is "hostT") in the operations management information 36 is renamed "hostT2", whereby the information relating to the disposed place of the management tool is updated and the place ("hostT2") of the management tool after transfer can be properly recognized by the manager 11.

With regard also to the backup data management table 37, sometimes the identifier of the management target 1331 serving as the target of name changing is similarly included in discrimination information 372 of the management target and discrimination information 373 of the management tool. If so, it may have a scheme to change the name.

It should be noted that, although the name changing processing of FIG. 17 is recursively executed similar to the "deletion" processing of FIG. 16, transfer processing (5303) of the management tool 1332 is executed only one time with respect to a one-time name changing instruction because the transfer processing can be conducted at once with respect to the overall operations management information 36. Thus, checking of that point (whether it has been recursively called or not) at the top portion of the name changing processing (5302) and transfer processing (5303) of the management tool if it is from the second on are not conducted.

Processing thereafter (5304 to 5313) is the same as the case of the "deletion" instruction. That which is different is calling "name changing" processing (5305) and not "deletion" processing when there is a management target 1331 corresponding to the child of the corresponding management target 1331, and the fact that the content of the instruction issued to the editing execution unit 1334 is "name changing" and not "deletion" (5308).

Further, in a case where the updated content of the operations management information 36 includes a portion indicating the management target 1331 of the renaming target in the selected item and not deletion of the selected item, the fact that that portion is renamed (5310) and the fact that the updated content of the management target configuration information 35 is the "renaming" of the corresponding place and not "deletion" of the corresponding item (5313) are also points that differ from the case of "deletion".

(5) Data Backup of Management Target

The flow of processing when an instruction relating to data backup of the management target is received is basically the same as processing when an instruction relating to deletion described above is received. The outline of the processing is as follows.

It is checked whether or not there is a management target 1331 corresponding to the direct child of the management target 1331 serving as the target of data backup. If there is a management target 1331 corresponding to the child, data backup processing with respect thereto is called. Then, management items relating to the corresponding management target 1331 are listed. Next, an editing instruction 21 of data backup is issued with respect to the editing execution unit 1334 per listed management item, and backup data is received from the editing execution unit 1334. The content of the received backup data is saved in the management definition BU data 1133, and updating of the backup data management table 37 corresponding to the same saving processing is conducted.

In contrast to the case of deletion of FIG. 16, updating of the operations management information 36 and the management target configuration information 35 (processing corresponding to 5208 and 5211 of FIG. 16) is not conducted.

2.4.2 Editing Operations with respect to Specific Management Definition Information Editing operations with respect to specific management definition information conduct deletion, temporary stopping, cancellation of temporary stopping and data backup using specific management definition information 1333 (and invalid status definition information 1336) relating to the management target 1331 as a unit, and are processing corresponding to processing instructions stemming from and generated by operation on the management item screen 42 per management item of the user I/F unit 1131.

(1) Deletion of Specific Management Definition Information

Processing relating to deleting specific management definition information has the form of executing part of the processing of "deletion of management target" described in Section 2.4.1. Specifically, the processing of 5206 to 5208 in the flow chart of FIG. 16 is executed. That is, an editing instruction 21 to delete management definition information that is the deletion target is issued to the editing execution unit 1334 (5206), notification from the editing execution unit 1334 that processing has ended is waited upon (5207), and management definition information corresponding to the deletion target of the present processing is deleted from the operations management information 36 (5208).

(2) Temporary Stopping of Specific Management Definition Information

Processing relating to temporary stopping of specific management definition information executes part of the processing of "temporary stopping of the management target" described in Section 2.4.1. Specifically, an editing instruction 21 to temporarily stop the management definition information of the stopping target is issued to the editing execution unit 1334, notification from the editing execution unit 1334 is waited upon, and the "status" column of the corresponding record (line) in the operations management information is set to invalid.

(3) Cancellation of Temporary Stopping of Specific Management Definition Information Cancellation of temporary stopping of specific management definition information is the same as the same temporary stopping, with "temporary stopping" becoming "cancellation of temporary stopping" and the "status" column of the corresponding record (line) being set to valid.

(4) Data Backup of Specific Management Definition Information

Processing relating to data backup of specific management definition information executes part of the "data backup of management target" described in Section 2.4.1. That is, an editing instruction 21 to back up management definition information serving as the target is issued to the editing execution unit 1334, notification from the editing execution unit 1334 is waited upon, and then the backed-up data is received from the same editing execution unit 1334.

Then, the received data is saved in the management definition BU data 1133 and information relating to the saved backup data is added to the backup data management table 37 (updating of the same management table is conducted).

2.4.3 Restoration Operation from Management Definition BU Data

The restoration operation from the management definition BU data returns, to the management definition information 1333 and the invalid status definition information 1336, the content of backup data stored in the management definition BU data 1133, and is processing corresponding to a processing instruction generated when a restoration target is selected from a backup data list table 4301 in a restore & backup data list screen 43 of the user I/F unit 1131 and a restoration execution button 4302 is pushed.

When the editing instruction unit 1134 receives a restoration processing instruction from the user I/F unit 1131 or the like, the editing instruction unit 1134 issues an editing instruction 21 to restore with respect to the editing execution unit 1334. At this time, data serving as the restoration target is also sent to the editing execution unit 1334 as part of the editing instruction 21.

The data of the restoration target is obtained by selecting a corresponding item from the backup data management table 37 and retrieving the backup data corresponding to that item from the management definition BU data 1133. For example, in a case where restoration of the line in which the backup ID is "BACKUP1" and the identifier of the management target is "hostT" is designated in the screen of FIG. 12, a data storage destination file name 374 corresponding to that line is searched for from the backup data management table 37 (in the example of FIG. 15, "d:¥BACKUP1¥01a.dat" and "d:¥BACKUP1¥01b.dat" are the storage destination files). As a result, the obtained file is used as the restoration target data.

2.5 Change Detection Unit

The change detection unit 1135 is realized by software (a program) stored in the storage device 113 being read into the memory 112 and executed by the CPU 111. The software of the change detection unit 1135 may also be stored in a location other than the storage device 113 as long as it can be implemented in the manager 11.

The status monitoring unit 1335 is handled as a management tool. For example, in the system configuration of FIG. 2, the host operation monitor 1334-*b*1 fulfills a role corresponding to the status monitoring unit 1335. The status monitoring unit 1335 periodically monitors the host with the identifier "hostT", determines that the operation of the "hostT" has stopped if there is no response from the "hostT", and notifies the change detection unit 1135 in the manager 11 thereof.

The main role of the change detection unit 1135 is to receive notification of a change in the management target operation status issued from the status monitoring unit 1335 placed in the agent 13 or the like and appropriately send a change instruction with respect to the editing instruction unit 1134.

To explain in accordance with the example of FIG. 2, when the operation of the "hostT" has stopped, there is notification thereof from the host operation monitor 1334-*b*1. When the change detection unit 1135 receives this notification, it issues a "temporarily stop" (the management tool 1332) instruction with respect to the editing instruction unit 1134 using, as a target, the management target 1331 whose identifier is "hostT" and whose type is "host". In accordance with this instruction, the editing instruction unit 1134, management definition information relating to the host of the name "hostT" is invalidated.

It should be noted that the embodiment may also be configured so that, when the fact that operation of the management target 1331 has stopped is detected, only some of the management items relating to that management target 1331 are stopped rather stopping all of the management items relating to that management target 1331. For example, when the fact that operation of the host has stopped is detected, the "backup scheduler" or the "disk reporter" might stop while the "disk monitor" or the "host operation monitor" do not stop.

Although the "disk monitor" that is the excluded target of stopping operates on the management target host, in a situation where the management target host (=agent) itself has stopped, there is the potential for the editing instruction 21 with respect to the agent 13 to not be conveyed from the manager 11 and for the management item to not be able to be placed in a stopped status. Thus, making it excluded from being stopped is conceivable.

Moreover, sometimes the user might wish to continue the monitoring operation even after the operation of the management target 1331 has stopped, for the reason of wanting to assess whether the management target 1331 has resumed operation. In this case, the "host operation monitor" may be an exclusion target of management item stopping. In order to realize this exclusion function, information representing which management item (or which management tool 1332) is to be an exclusion target of automatic (associated) stopping is retained in the change detection unit and, on the basis of that information, a stopping instruction is sent with respect to the editing instruction unit 1134 only in relation to items that are not targets of exclusion.

In addition to temporary stopping of a management function associated with the stopping of a management target, deletion of a management function associated with deletion of a management target is also conceivable. When a management target 1331 becomes unnecessary and is to be deleted, the management items for that management target 1331 also become unnecessary, and it is necessary to delete the same management items in order to avoid mistaken operation.

In order to automatize deletion of management items, a scheme is given to detect deletion of a management target 1331 and instruct the editing instruction unit 1134 to delete management items relating to the same management target 1331. An example of the implementation of such a scheme will next be described.

Sometimes deletion of a management target 1331 is conducted by a command to delete a management target being inputted from the system manager (user). For example, it will be assumed that a command called unmount is used conducting allocation deletion of volume allocated to a specific directory. In this case, working is administered to the unmount command, and notification to delete the unmount target is given to the editing instruction unit 1134 when the command is executed.

As for the working of the unmount command, a command of the same name (having the name unmount) so as to overlap the function of an ordinary unmount command is prepared and the overlapping command is called from the system manager. Then, in the overlapping command, execution of the ordinary unmount command and notification to the editing instruction unit 1134 are conducted.

It should be noted that, when it is not the case that a management item is to always be deleted when the unmount command is conducted, confirmation as to whether or not a management item is to be deleted may be sought from the system manager when the unmount command is inputted, so that a management item is deleted only when deletion has been instructed.

As another embodiment of the above-described example, information representing the relationship between the management target 1331 and the management tool 1332 may also be dynamically retained rather than statically retained. Specifically, the operations management information 36 of the above-described example is substituted with management tool disposition information 38 shown in FIG. 18.

The management tool disposition information 38 is for representing the location of existing management tools, and is a subset of the operations management information 36. The processing method is partially different from that of the above-described example. When it has become necessary to change the management item of a management item unit, an editing instruction 21 (FIG. 7) is respectively issued with respect to (the editing execution unit 1334 for) all of the management items 1332 in the management tool disposition information 38.

Because editing instructions 21 that are not in themselves directly related are also sometimes sent in the editing execution unit 1334, the content of the editing instructions 21 is viewed and it is determined whether or not to process the content. That is, the editing execution unit 1334 receiving the editing instructions 21 determines whether or not the editing instructions 21 with respect to the management targets 1331 identified by the three items of the management target location 214, the management target type 215 and the management target identifier 216, which are included in the editing instructions 21, are related (whether definitions relating to the management targets 1331 designated by the editing instructions 21 are included) to the management definition information 1333 and the invalid status definition information 1336 handled by the editing execution unit 1334. If they are related, processing in accordance with the editing instructions 21 is conducted similar to the above-described example, and if they are not related, nothing is done.

It should be noted that a scheme for narrowing down the transmission destination may also be given rather than sending all of the editing instructions 21 in the management tool disposition information 38.

There are management tools 1332 where the management targets 1331 of the management tools 1332 are limited to the location (host) at which the management tools 1332 are disposed. In the management tools 1332 introduced in FIG. 2, the "disk monitor 1331-*c*" corresponds to this, and the drives (the drive C 1331-*c*1 and the drive D 1331-*c*2) in the "hostT" in which the same tool is disposed are the management targets 1331.

In this case, even if a change arises in the management item relating to the management target 1331 present in a location other than the "hostT", this does not affect the operation (management item) of the "disk monitor 1331-*c*" operating on the "hostT", and it is not necessary to issue an editing instruction 21 to the editing execution unit 1334-*c* corresponding to the same management tool.

In order to conduct narrowing down of the editing instructions 21 issuance destinations, information for distinguishing the management target range of the management tool 1332 may be given. Management tool characteristic information 39 shown in FIG. 19 defines, in the example of that information, whether or not the management target range of that management tool 1332 is limited to the same host as the disposition destination of the management tool 1332 per type of management tool 1332.

Thus, with regard to a management tool 1332 defined as "limited to within the same host", it becomes the narrowed down target. That is, when conducting an editing operation of a management item relating to a management target 1331 present in a location different from that management tool 1332, the embodiment is configured so that the editing instruction 21 is not sent to the editing execution unit 1334 corresponding to that management tool 1332.

Automatization of setting item (management item) changing labor of a management tool accompanying a change in the status of a management target can be promoted by a scheme (management target information) that grasps which management tool is used to manage the management items and a scheme (editing instruction unit, editing execution unit, etc.) that conducts, on the basis of that information, setting change of the management tool per management target, which schemes are provided by the present embodiment.

The specific promotion contents are deletion of management items per management target, temporary stopping and resuming of management operations per management target, and setting changes of management items accompanying changes in the names of the management targets, and setting change labor that had conventionally required manual labor per management tool can be accomplished simply by issuing a simple instruction (e.g., an instruction to "delete management items relating to management target A").

Moreover, by providing backup and restore functions of management items per management target, management items can be restored to their initial status when management items have been lost due to an operational error or the like.

In addition, with the above-described function that the embodiment provides, processing that is conscious of parent-child relations of management targets is possible, and when it is desired to change all management items of management targets having a hierarchical structure, the user (system manager) can include in the change targets management targets corresponding to children simply by designating management targets corresponding to parents, so that the labor of designating the management targets can be further reduced.

Further, as the above-described applied function, automatically stopping related management items (or deletion of management items) can be conducted when the operation of a management target has stopped (or when a management target has been deleted) by using a function for automatically changing the management item in accordance with a change in the status of the management item.

According to the operation, changing of management items corresponding to changes in the status of a management target can be conducted without manual input from the user (system manager). As described above, the labor burden of a user (system manager) using management tools can be reduced.

The above-described arrangements of apparatus and methods are merely illustrative of applications of the principles of this invention and many other embodiments and modifications may be made without departing from the spirit and scope of the invention as defined in the claims. The scope of the invention should, therefore, be determined not with reference to the above description, but instead should be determined with reference to the appended claims along with their full scope of equivalents.

What is claimed is:

1. A management item management system for managing management items with respect to management targets retained by an operations management module that operates and manages the management targets in a computer system, the management item management system comprising:

an operations management information module configured to accumulate operations management information that identifies management targets and operations management modules managing the management targets in the computer system, wherein the operations management information identifies management items;

a display module configured to display the operations management information including the management targets, wherein the display module is configured to display a plurality of editing processing classes with respect to the operations management information and the management items;

a selection module configured to select operations management information which contains a management target displayed by the display module in response to an instruction of a user, wherein the selection module is configured to select the operations management information and the plurality of editing processing classes with respect to the management items in response to the instruction of the user; and an editing instruction unit, wherein the editing instruction unit is configured to issue an editing instruction for editing processing of the selected editing processing classes with respect to the management items identified as editing processing items; and an editing execution unit configured to move the editing processing items to a different storage module from a storage module storing the management items when an editing processing class with respect to the management items identified as editing processing items has temporarily stopped in response to a temporary stop instruction being issued for a management target associated with the editing processing class, and to move the editing processing items from the different storage module to the storage module storing the management items prior to the temporary stopping when the temporary stopping is cancelled in response to the temporary stopping instruction for the management target being cancelled.

2. The management item management system of claim 1, further comprising an editing instruction unit configured to send an editing instruction to an editing execution unit of the computer system to edit one or more of the management items serving as editing processing items based on the editing instruction.

3. The management item management system of claim 2, wherein the display module is configured to display a plurality of editing processing classes of the management items based on the selected target and operations management module; wherein the selection module is configured to select the operations management information and the plurality of editing processing classes with respect to the management items in response to the instruction of the user; and wherein the editing instruction unit is configured to issue an editing instruction for editing processing of the selected editing processing classes with respect to the determined management targets.

4. The management item management system of claim 2, further comprising a change detection unit configured to detect a change in status of the management targets to obtain detection result and, based on the detection result, notify the editing instruction unit of the change in status of the management targets; wherein the editing instruction unit is configured to receive the notification and to instruct editing processing with respect to the management items in response to the notification.

5. The management item management system of claim 1, wherein the management targets comprise hardware items or software items or both hardware and software items.

6. The management item management system of claim 1, wherein the management items comprise contents of management targets being managed by the operations management module in the computer system.

7. A management system comprising:
   a computer system including operations management modules configured to operate and manage management targets; and
   a management item management system including:
      an operations management information module configured to accumulate operations management information that identifies management targets and operations management modules managing the management targets in the computer system, wherein the operations management information identifies management items;
      a display module configured to display the operations management information including the management targets, wherein display module is configured to display a plurality of editing processing classes with respect to the operations management information and the management items;
      a selection module configured to select operations management information which contains a management target displayed by the display module in response to an instruction of a user, wherein the selection module is configured to select the operations management information and the plurality of editing processing classes with respect to the management items in response to the instruction of the user;
      an editing instruction unit, wherein the editing instruction unit is configured to issue an editing instruction for editing processing of the selected editing processing classes with respect to the management items identified as editing processing item; and
      an editing execution unit configured to move the editing processing items to a different storage module from a storage module storing the management items when an editing processing class with respect to the management items identified as editing processing items has temporarily stopped in response to a temporary stop instruction being issued for a management target associated with the editing processing class, and to move the editing processing items from the different storage module to the storage. module storing the management items prior to the temporary stopping when the temporary stopping is cancelled in response to the temporary stopping instruction for the management target being cancelled.

8. The management system of claim 7, wherein management items of other dependent management targets dependent on presence of the management targets associated with the editing processing items are included in the management items serving as the editing processing items, with the editing module executing editing processing of the same class with respect to the management items retained by the other dependent management targets.

9. The management system of claim 7, wherein the computer system further comprises an editing execution unit configured to move the editing processing items to a backup storage module from a storage module storing the management items when an editing processing class with respect to the management items identified as editing processing items is backed up, and to move the editing processing items to the storage module storing the management items prior to being backed up from the backup storage module at a time of restoration.

10. The management system of claim 7, wherein the computer system further comprises an editing execution unit configured to perform editing processing of the management items in the computer system in response to the editing instruction, said editing processing including at least one of:
   deleting one or more management items with respect to management targets when deletion of the one or more management items is received as an editing instruction by the computer system;
   invalidating one or more management items with respect to management targets when temporary stop relating to the one or more management items is received as an editing instruction by the computer system;
   validating one or more management items with respect to management targets when cancellation of temporary stop relating to the one or more management items is received as an editing instruction by the computer system;
   changing an identifier of a designated management target in one or more management items with respect to management targets when change of management target name relating to the one or more management items is received as an editing instruction by the computer system;
   moving, to a backup memory, one or more management items with respect to management targets when back up relating to the one or more management items is received as an editing instruction by the computer system; and
   moving, from the backup memory to the operations management module, one or more management items with respect to management targets when restoration relating to the one or more management items is received as an editing instruction by the computer system.

11. A management method for managing management items with respect to management targets retained by an operations management module that operates and manages the management targets in a computer system, the management method comprising:
   accumulating, in a memory, operations management information that identifies management targets and operations management modules managing the management targets in the computer system, wherein the operations management information identifies management items;
   displaying the operations management information, including the management targets, wherein displaying the operations management information comprises displaying a plurality of editing processing classes with respect to the operations management information and the management items;
   selecting operations management information which contains a management target displayed by the display module in response to an instruction of a user, wherein selecting the operations management information comprises selecting the operations management information and the plurality of editing processing classes with respect to the management items in response to the instruction of the user; and issuing an editing instruction for editing processing of the selected editing processing classes with respect to the selected management items;

when an editing processing class with respect to the management items identified as editing processing items has temporarily stopped in response to a temporary stop instruction being issued for a management target associated with the editing processing class, moving the editing processing items to a different storage module from a storage module storing the management items; and when the temporary stopping is cancelled in response to the temporary stopping instruction for the management target being cancelled, moving the editing processing items from the different storage module to the storage module storing the management items prior to the temporary stopping.

12. The management method of claim 11, further comprising sending an editing instruction to an editing execution unit of the computer system to edit one or more of the management items serving as editing processing items based on the editing instruction.

13. The management method of claim 11, further comprising, in a case where a change in status of the management targets is detected, editing processing of the selected processing classes with respect to the determined management items retained by the operations management module managing the management targets.

14. The management method of claim 11, further comprising including in the management items serving as the editing processing items, management items of other dependent management targets dependent on presence of the management targets associated with the editing processing items; and executing editing processing of the same class with respect to the management items retained by the other dependent management targets.

15. The management method of claim 11, wherein when an editing processing class with respect to the management items identified as editing processing items is backed up, moving the editing processing items to a backup storage module from a storage module storing the management items; and at a time of restoration, moving the editing processing items to the storage module storing the management items prior to being backed up from the backup storage module.

16. The management method of claim 11, further comprising editing processing of the management items in the computer system in response to the editing instruction.

17. The management method of claim 16, wherein editing processing of the management items in the computer system in response to the editing instruction comprises:

deleting one or more management items with respect to management targets when deletion of the one or more management items is received as an editing instruction by the computer system;

invalidating one or more management items with respect to management targets when temporary stop relating to the one or more management items is received as an editing instruction by the computer system;

validating one or more management items with respect to management targets when cancellation of temporary stop relating to the one or more management items is received as an editing instruction by the computer system;

changing an identifier of a designated management target in one or more management items with respect to management targets when change of management target name relating to the one or more management items is received as an editing instruction by the computer system;

moving, to a backup memory, one or more management items with respect to management targets when back up relating to the one or more management items is received as an editing instruction by the computer system; and moving, from the backup memory to the operations management module, one or more management items with respect to management targets when restoration relating to the one or more management items is received as an editing instruction by the computer system.

18. In a computer readable medium storing a program for managing management items with respect to management targets retained by an operations management module that operates and manages the management targets in a computer system, the program comprising:

code for accumulating, in a memory, operations management information that identifies management targets and operations management module managing the management targets in the computer system, wherein the operations management information identifies management items;

code for displaying the operations management information, including the management targets, wherein the code for displaying the operations management information comprises code for displaying a plurality of editing processing classes with respect to the operations management information and the management items;

code for selecting operations management information which contains a management target displayed by the display module in response to an instruction of a users, wherein the code for selecting the operations management information comprises code for selecting the operations management information and the plurality of editing processing classes with respect to the management items in response to the instruction of the user; and code for issuing an editing instruction for editing processing of the selected editing processing classes with respect to the selected management items;

code for, when an editing processing class with respect to the management items identified as editing processing items has temporarily stopped in response to a temporary stop instruction being issued for a management target associated with the editing processing class, moving the editing processing items to a different storage module from a storage module storing the management items; and code for, when the temporary stopping is cancelled in response to the temporary stopping instruction for the management target being cancelled, moving the editing processing items from the different storage module to the storage module storing the management items prior to the temporary stopping.

19. The program of claim 18, further comprising code for sending an editing instruction to an editing execution unit of the computer system to edit one or more of the management items serving as editing processing items based on the editing instruction.

20. The program of claim 18, further comprising code for, in a case where a change in status of the management targets is detected, editing processing of the selected processing classes with respect to the management items identified as editing processing items.

21. The program of claim 18, further comprising:

code for including in the management items serving as the editing processing items, management items of other dependent management targets dependent on presence of the management targets associated with the editing processing items; and code for executing editing processing of the same class with respect to the management items identified as editing processing items by the other dependent management targets.

22. The program of claim 18, further comprising:

code for, when an editing processing class with respect to the management items identified as editing processing items is backed up, moving the editing processing items to a backup storage module from a storage module storing the management items; and code for, at a time of restoration, moving the editing processing items to the storage module storing the management items prior to being backed up from the backup storage module.

23. The program of claim 18, further comprising code for editing processing of the management items in the computer system in response to the editing instruction.

24. The program of claim 23, wherein the code for editing processing of the management items in the computer system in response to the editing instruction comprises:

code for deleting management items with respect to management targets when deletion is received as an editing instruction by the computer system;

code for invalidating management items with respect to management targets when temporary stop is received as an editing instruction by the computer system;

code for validating management items with respect to management targets when cancellation of temporary stop is received as an editing instruction by the computer system;

code for changing an identifier of a designated management target in management items with respect to management targets when change of management target name is received as an editing instruction by the computer system;

code for moving, to a backup memory, management items with respect to management targets when back up is received as an editing instruction by the computer system; and code for moving, from the backup memory to the operations management module, management items with respect to management targets when restoration is received as an editing instruction by the computer system.

25. A management system comprising:

a computer system including:

a display unit;

plurality of management targets;

a plurality of operations management modules configured to operate and manage the management targets; and a status monitoring unit configured to monitor status of the management targets; and a management item management system for managing management items with respect to management targets retained by the operations management modules that operates and manages the management targets in the computer system, the management item management system including:

an operations management information module configured to accumulate operations management information that identifies management targets and operations management modules managing the management targets in the computer system;

a selection module configured to select operations management information which contains a management target displayed by the display unit in response to an instruction of a user, the operations management information identifying management items;

a change detection unit configured to receive notification from the status monitoring unit of the computer system of a change in the status of the management targets; and an editing instruction unit configured to instruct editing process with respect to management items relating to management targets for which notification of a change in the status is received from the change detection unit, wherein the computer system further comprises an editing execution unit configured to execute editing processing of the management items based on an instruction sent from the editing instruction unit of the management item management system, wherein the editing execution unit is configured to move the editing processing items to a different storage module from a storage module storing the management items when an editing processing class with respect to management items identified as editing processing items has temporarily stopped in response to a temporary stop instruction being issued for a management target associated with the editing processing class, and to move the editing processing items from the different storage module to the storage module storing the management items prior to the temporary stopping when the temporary stopping is cancelled in response to the temporary stopping instruction for the management target being cancelled; and wherein the display unit is configured to display the operations management information and to display a plurality of editing processing classes with respect to the operations management information and the management items.

* * * * *